US012756800B2

(12) United States Patent
Ooguni

(10) Patent No.: US 12,756,800 B2
(45) Date of Patent: Oct. 6, 2026

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Toshihiro Ooguni, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 39 days.

(21) Appl. No.: 19/055,725

(22) Filed: Feb. 18, 2025

(65) Prior Publication Data

US 2025/0193352 A1 Jun. 12, 2025

Related U.S. Application Data

(63) Continuation of application No. PCT/JP2023/026850, filed on Jul. 21, 2023.

(30) Foreign Application Priority Data

Aug. 19, 2022 (JP) ................................. 2022-131119

(51) Int. Cl.
*H04N 9/31* (2006.01)

(52) U.S. Cl.
CPC ......... *H04N 9/3147* (2013.01); *H04N 9/3185* (2013.01)

(58) Field of Classification Search
None
See application file for complete search history.

(56) References Cited

U.S. PATENT DOCUMENTS

2018/0013995 A1 1/2018 Mizushiro
2019/0116356 A1 4/2019 Matoba et al.
(Continued)

FOREIGN PATENT DOCUMENTS

| | | | |
|---|---|---|---|
| JP | 2005-229282 | A | 8/2005 |
| JP | 2018-5018 | A | 1/2018 |
| JP | 2018-121964 | A | 8/2018 |
| JP | 2022-114697 | A | 8/2022 |
| WO | WO 2017/179272 | A1 | 10/2017 |
| WO | WO 2019/012774 | A1 | 1/2019 |

OTHER PUBLICATIONS

International Preliminary Report on Patentability, with English translation, and Written Opinion of the International Searching Authority for International Application No. PCT/JP2023/026850, dated Apr. 26, 2024.

(Continued)

*Primary Examiner* — Samira Monshi
(74) *Attorney, Agent, or Firm* — Birch, Stewart, Kolasch & Birch, LLP

(57) ABSTRACT

An image processing apparatus comprising a processor. The processor is configured to: acquire first image data obtained by imaging a space with an imaging apparatus; determine a first position that is in the space and corresponds to a position of a virtual projection surface and a second position serving as a reference for an orientation of the virtual projection surface in the space; determine the orientation of the virtual projection surface based on a positional relationship between the first position and the second position and generate virtual projection surface data representing the virtual projection surface; generate second image data representing a second image in which the virtual projection surface is displayed on a first image represented by the first image data, based on the first image data and on the virtual projection surface data; and output the second image data to an output destination.

16 Claims, 14 Drawing Sheets

(56) References Cited

U.S. PATENT DOCUMENTS

| | | | | |
|---|---|---|---|---|
| 2020/0112707 | A1* | 4/2020 | Kobayashi | H04N 9/3182 |
| 2021/0407204 | A1 | 12/2021 | Wang et al. | |
| 2022/0086413 | A1* | 3/2022 | Adachi | G06T 7/73 |
| 2022/0237827 | A1 | 7/2022 | Kitabayashi et al. | |
| 2022/0264066 | A1 | 8/2022 | Kitabayashi | |
| 2023/0186569 | A1* | 6/2023 | Willkie | G06T 7/12<br>345/633 |
| 2023/0247184 | A1* | 8/2023 | Mashitani | H04N 9/3147<br>348/744 |
| 2024/0316450 | A1* | 9/2024 | Okamura | A63F 13/213 |

OTHER PUBLICATIONS

International Search Report for International Application No. PCT/JP2023/026850, dated Sep. 26, 2023, with English translation.

* cited by examiner

IMAGE PROCESSING APPARATUS, IMAGE PROCESSING METHOD, AND IMAGE PROCESSING PROGRAM

CROSS-REFERENCE TO RELATED APPLICATIONS

This is a continuation of International Application No. PCT/JP2023/026850 filed on Jul. 21, 2023, and claims priority from Japanese Patent Application No. 2022-131119 filed on Aug. 19, 2022, the entire content of which is incorporated herein by reference.

BACKGROUND OF THE INVENTION

1. Field of the Invention

The present invention relates to an image processing apparatus, an image processing method, and a storage medium that stores an image processing program.

2. Description of the Related Art

WO2019/012774A discloses an information processing apparatus that outputs projector disposition information related to disposition of a projector based on projection conditions related to projection with the projector in order to reduce a burden on disposition design of the projector.

WO2017/179272A discloses an information processing apparatus that acquires setting information related to projection of an image with an image projection apparatus and that generates a simulation image including a plurality of the image projection apparatuses and a display region of each of a plurality of images projected by the plurality of image projection apparatuses, based on the acquired setting information.

JP2018-121964A discloses a projection toy in which a first placement portion, a second placement portion, and a third placement portion for placing a body, which is provided with a projection portion capable of projecting a video to an object, on a placement surface are provided in the body to facilitate projection in three directions, and the first placement portion, the second placement portion, and the third placement portion are provided to face in different directions from each other.

SUMMARY OF THE INVENTION

One embodiment according to the technology of the present disclosure provides an image processing apparatus, an image processing method, and a non-transitory computer-readable storage medium that stores an image processing program capable of improving a user convenience related to a disposition of a projection surface or a projection apparatus.

According to one aspect of the present invention, there is provided an image processing apparatus comprising a processor, in which the processor is configured to: acquire first image data obtained by imaging a space with an imaging apparatus; determine a first position corresponding to a position of a virtual projection surface and a second position serving as a reference for an orientation of the virtual projection surface, in the space; determine the orientation of the virtual projection surface based on a positional relationship between the first position and the second position and generate virtual projection surface data representing the virtual projection surface; generate second image data representing a second image in which the virtual projection surface is displayed on a first image represented by the first image data, based on the first image data and on the virtual projection surface data; and output the second image data to an output destination.

According to another aspect of the present invention, there is provided an image processing method executed by a processor included in an image processing apparatus, the image processing method comprising: acquiring first image data obtained by imaging a space with an imaging apparatus; determining a first position corresponding to a position of a virtual projection surface and a second position serving as a reference for an orientation of the virtual projection surface, in the space; determining the orientation of the virtual projection surface based on a positional relationship between the first position and the second position and generating virtual projection surface data representing the virtual projection surface; generating second image data representing a second image in which the virtual projection surface is displayed on a first image represented by the first image data, based on the first image data and on the virtual projection surface data; and outputting the second image data to an output destination.

According to still another aspect of the present invention, there is provided a non-transitory computer-readable storage medium that stores an image processing program for causing a processor included in an image processing apparatus to execute a process comprising: acquiring first image data obtained by imaging a space with an imaging apparatus; determining a first position corresponding to a position of a virtual projection surface and a second position serving as a reference for an orientation of the virtual projection surface, in the space; determining the orientation of the virtual projection surface based on a positional relationship between the first position and the second position and generating virtual projection surface data representing the virtual projection surface; generating second image data representing a second image in which the virtual projection surface is displayed on a first image represented by the first image data, based on the first image data and on the virtual projection surface data; and outputting the second image data to an output destination.

According to the aspects of the present disclosure, it is possible to provide an image processing apparatus, an image processing method, and an image processing program capable of improving a user convenience related to a disposition of a projection surface or a projection apparatus.

DESCRIPTION OF THE PREFERRED EMBODIMENTS

An example of an embodiment of the present invention will be described below with reference to the drawings.

Embodiment

<Projection Apparatus 10 That is Target for Installation Support by Image Processing Apparatus According to Embodiment>

Figure 1:
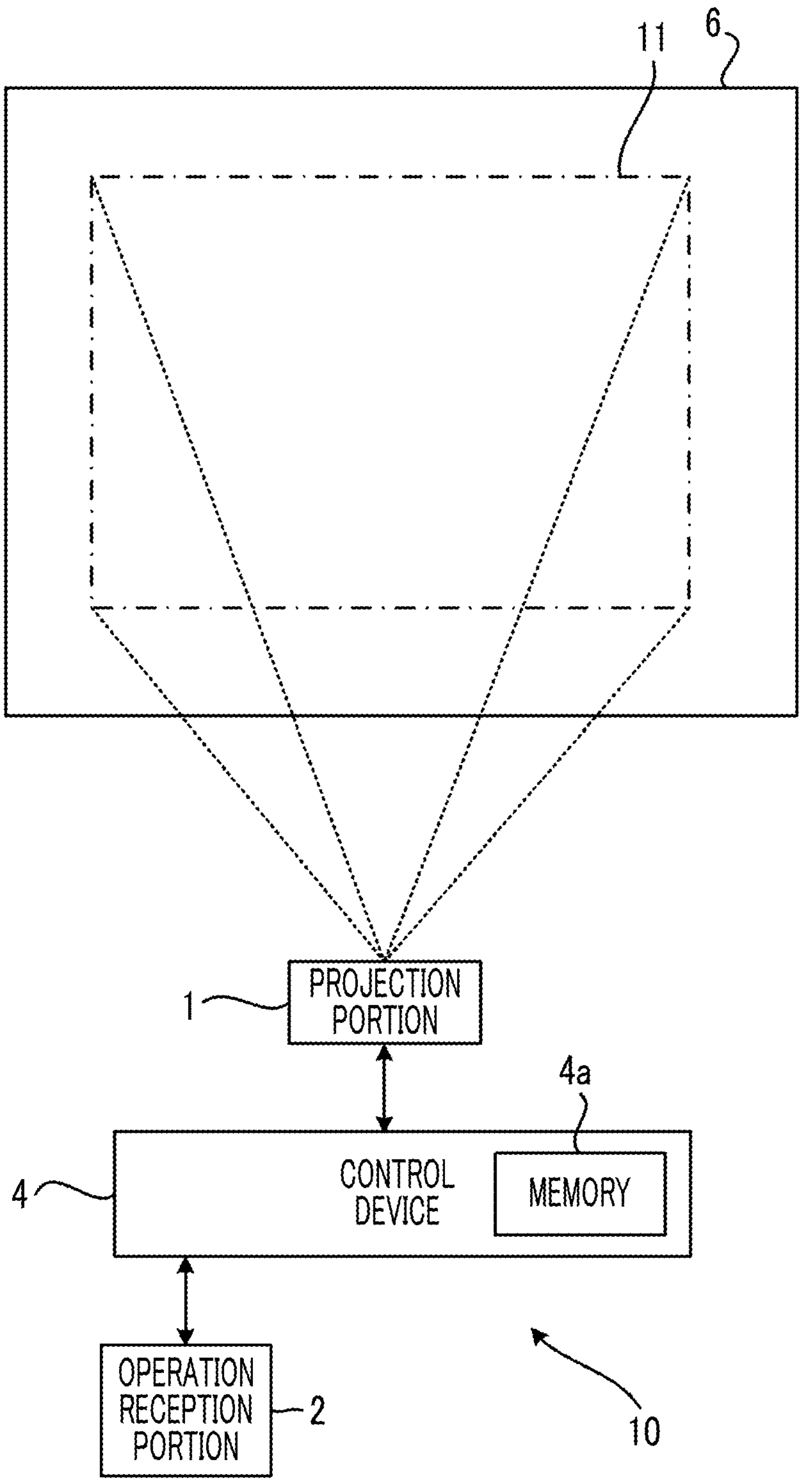
FIG. 1 is a schematic diagram showing an example of a projection apparatus 10 that is a target for installation support by an image processing apparatus according to an embodiment.

FIG. 1 is a schematic diagram showing an example of the projection apparatus 10 that is a target for installation support by an image processing apparatus according to an embodiment.

The image processing apparatus according to the embodiment can be used, for example, to support disposition of the projection apparatus 10. The projection apparatus 10 comprises a projection portion 1, a control device 4, and an operation reception portion 2. The projection portion 1 is composed of, for example, a liquid crystal projector or a projector using liquid crystal on silicon (LCOS). In the following description, it is assumed that the projection portion 1 is a liquid crystal projector.

The control device 4 is a control device that controls projection performed by the projection apparatus 10. The control device 4 is a device including a control unit composed of various processors, a communication interface (not shown) for communicating with each portion, and a memory **4*a* such as a hard disk, a solid-state drive (SSD), or a read-only memory (ROM) and integrally controls the projection portion 1**.

Examples of the various processors of the control unit of the control device 4 include a central processing unit (CPU) which is a general-purpose processor that executes a program to perform various types of processing, a programmable logic device (PLD) which is a processor capable of changing a circuit configuration after manufacture such as a field-programmable gate array (FPGA), a dedicated electrical circuit which is a processor having a circuit configuration exclusively designed to execute specific processing such as an application-specific integrated circuit (ASIC), or the like.

More specifically, a structure of these various processors is an electrical circuit in which circuit elements such as semiconductor elements are combined. The control unit of the control device 4 may be configured with one of the various processors or may be configured with a combination of two or more processors of the same type or different types (for example, a combination of a plurality of FPGAs or a combination of a CPU and an FPGA).

The operation reception portion 2 detects an instruction from a user by receiving various operations from the user. The operation reception portion 2 may be a button, a key, a joystick, or the like provided in the control device 4 or may be a reception portion or the like that receives a signal from a remote controller for remotely operating the control device 4.

A projection object 6 is an object such as a screen or a wall having a projection surface on which a projection image is displayed by the projection portion 1. In the example shown in FIG. 1, in the projection object 6, the projection surface of the projection object 6 is a rectangular plane. It is assumed that upper, lower, left, and right sides of the projection object 6 in FIG. 1 are upper, lower, left, and right sides of the actual projection object 6.

A projection surface 11 shown by a dot-dashed line is a region irradiated with projection light by the projection portion 1 in the projection object 6. In the example shown in FIG. 1, the projection surface 11 is rectangular. The projection surface 11 is a part or the entirety of a projectable range in which the projection can be performed by the projection portion 1.

Figure 3:
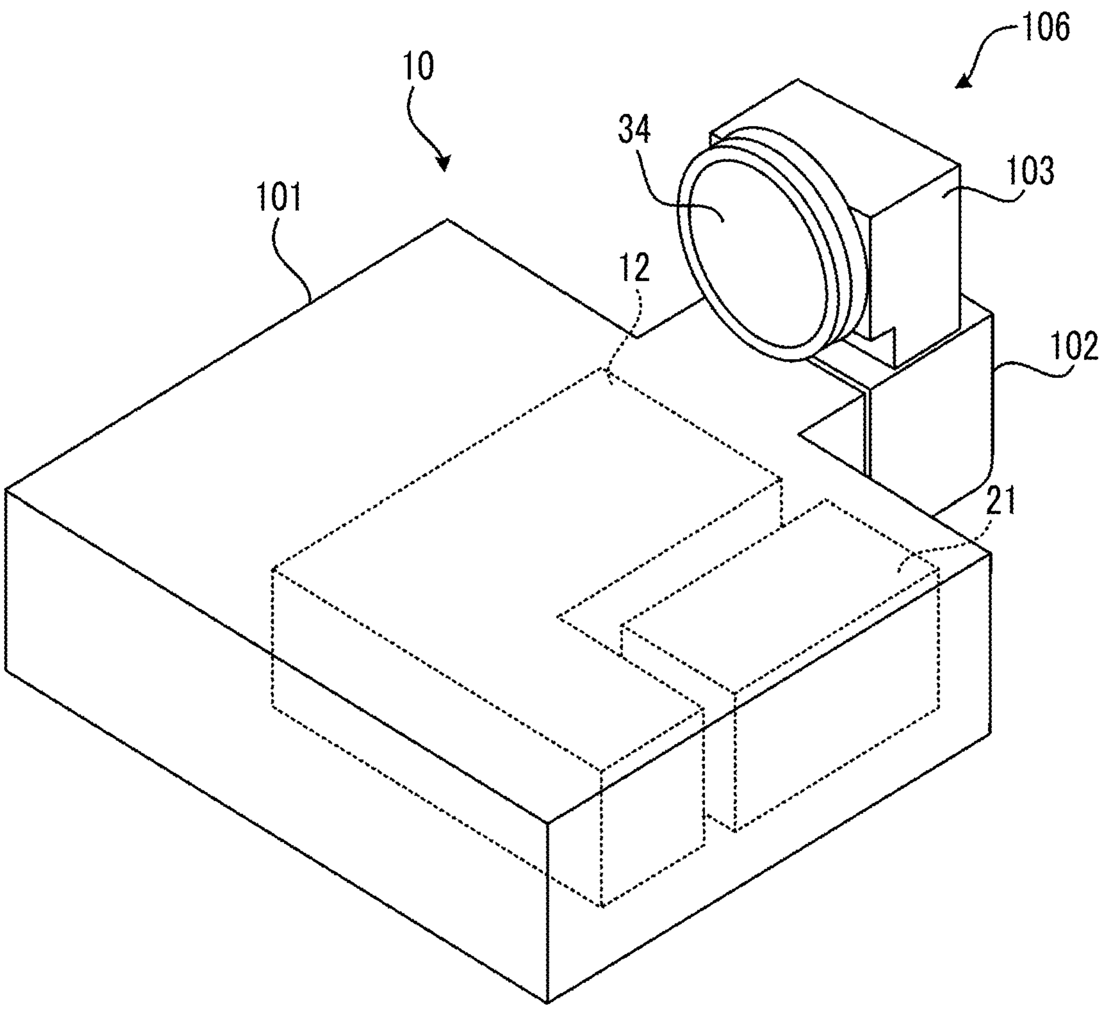
FIG. 3 is a schematic diagram showing an external configuration of the projection apparatus 10.
Figure 4:
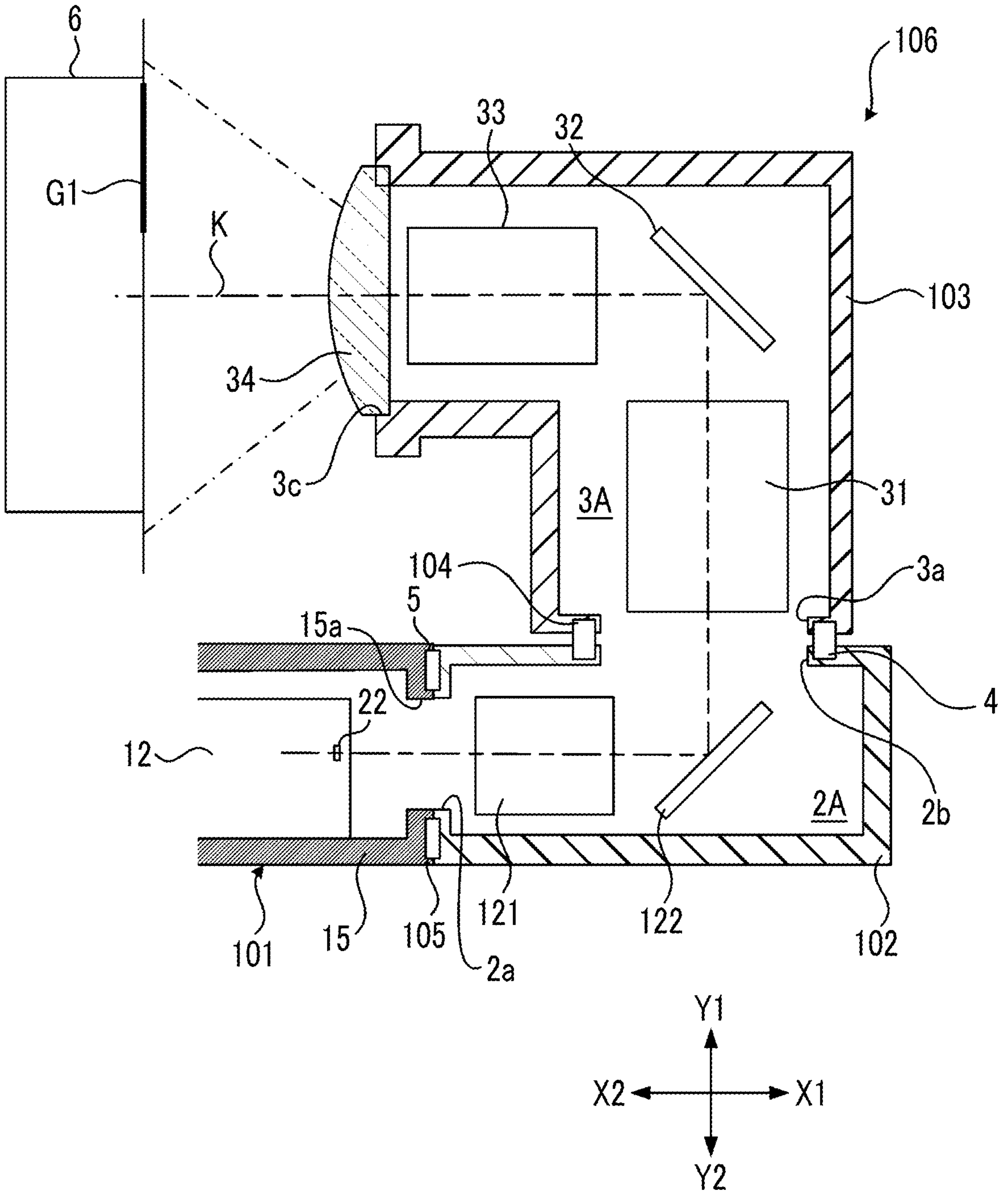
FIG. 4 is a schematic cross-sectional view of an optical unit 106 of the projection apparatus 10 shown in FIG. 3.

The projection portion 1, the control device 4, and the operation reception portion 2 are implemented by, for example, a single device (for example, see FIGS. 3 and 4). Alternatively, the projection portion 1, the control device 4, and the operation reception portion 2 may be separate devices that cooperate by communicating with each other.

<Internal Configuration of Projection Portion 1 Shown in FIG. 1>

Figure 2:
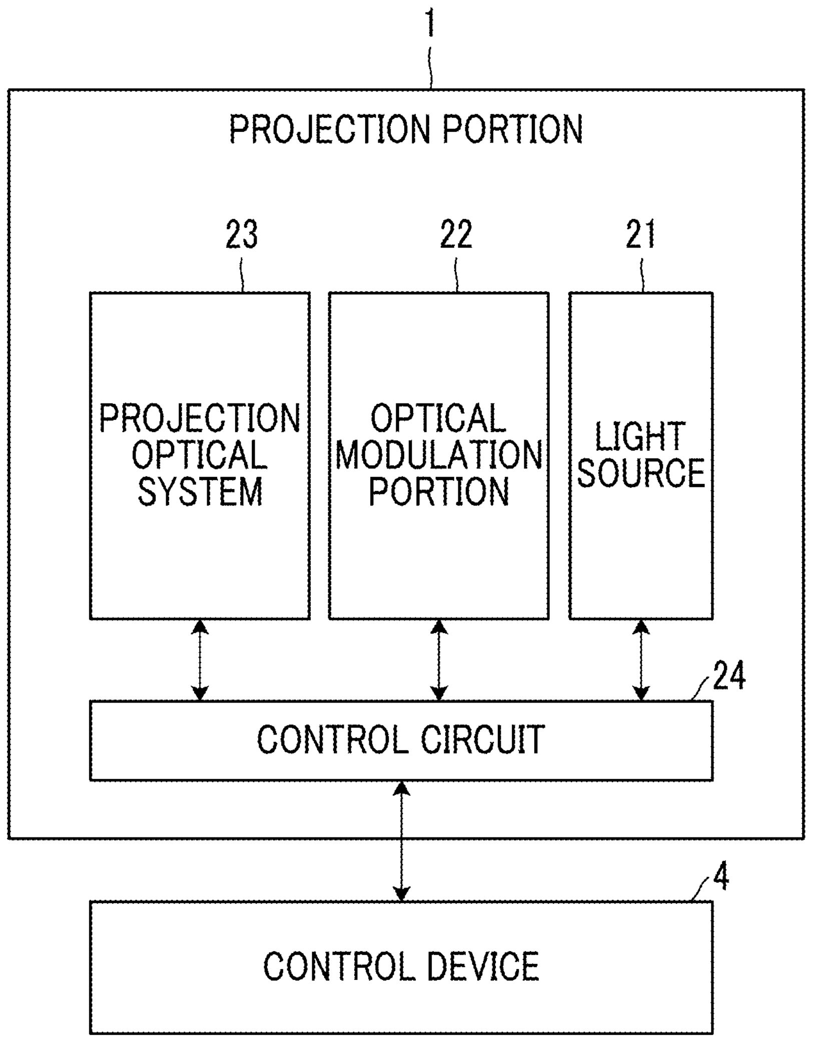
FIG. 2 is a schematic diagram showing an example of an internal configuration of a projection portion 1 shown in FIG. 1.

FIG. 2 is a schematic diagram showing an example of an internal configuration of the projection portion 1 shown in FIG. 1.

As shown in FIG. 2, the projection portion 1 comprises a light source 21, an optical modulation portion 22, a projection optical system 23, and a control circuit 24.

The light source 21 includes a light emitting element such as a laser or a light emitting diode (LED) and emits, for example, white light.

The optical modulation portion 22 is composed of three liquid crystal panels that emit each color image by modulating, based on image information, each color light beam which is emitted from the light source 21 and is separated into three colors of red, blue, and green by a color separation mechanism (not shown). Filters of red, blue, and green may be mounted in each of the three liquid crystal panels, and each color image may be emitted by modulating the white light emitted from the light source 21 in each liquid crystal panel.

The light from the light source 21 and the optical modulation portion 22 is incident on the projection optical system 23. The projection optical system 23 includes at least one lens and is composed of, for example, a relay optical system. The light that has passed through the projection optical system 23 is projected onto the projection object 6.

In the projection object 6, a region irradiated with the light transmitted through the entire range of the optical modulation portion 22 is the projectable range in which the projection can be performed by the projection portion 1. Within this projectable range, a region irradiated with the light actually transmitted from the optical modulation portion 22 is the projection surface 11. For example, in the projectable range, a size, a position, and a shape of the projection surface 11 are changed by controlling a size, a position, and a shape of a region through which the light is transmitted in the optical modulation portion 22.

The control circuit 24 controls the light source 21, the optical modulation portion 22, and the projection optical system 23 based on the display data input from the control device 4, thereby projecting an image based on this display data onto the projection object 6. The display data input to the control circuit 24 is composed of three pieces of data including red display data, blue display data, and green display data.

In addition, the control circuit 24 changes the projection optical system 23 based on an instruction input from the control device 4, thereby enlarging or reducing the projection surface 11 (see FIG. 1) of the projection portion 1. In addition, the control device 4 may move the projection surface 11 of the projection portion 1 by changing the projection optical system 23 based on the operation received by the operation reception portion 2 from the user.

The projection apparatus 10 also comprises a shift mechanism that mechanically or optically moves the projection surface 11 while maintaining an image circle of the projection optical system 23. The image circle of the projection optical system 23 is a region where the projection light incident on the projection optical system 23 appropriately passes through the projection optical system 23 in terms of a light fall-off, color separation, edge part curvature, or the like.

The shift mechanism is implemented by at least any of an optical system shift mechanism that performs optical system shifting or an electronic shift mechanism that performs electronic shifting.

The optical system shift mechanism is, for example, a mechanism (for example, see FIGS. 3 and 4) that moves the projection optical system 23 in a direction perpendicular to an optical axis or a mechanism that moves the optical modulation portion 22 in the direction perpendicular to the optical axis instead of moving the projection optical system 23. Furthermore, the optical system shift mechanism may perform the movement of the projection optical system 23 and the movement of the optical modulation portion 22 in combination with each other.

The electronic shift mechanism is a mechanism that performs pseudo shifting of the projection surface 11 by changing a range through which the light is transmitted in the optical modulation portion 22.

The projection apparatus 10 may also comprise a projection direction changing mechanism that moves the image circle of the projection optical system 23 and the projection surface 11. The projection direction changing mechanism is a mechanism that changes a projection direction of the projection portion 1 by changing the orientation of the projection portion 1 through mechanical rotation (for example, see FIGS. 3 and 4).

<Mechanical Configuration of Projection Apparatus 10>

FIG. 3 is a schematic diagram showing an external configuration of the projection apparatus 10. FIG. 4 is a schematic cross-sectional view of an optical unit 106 of the projection apparatus 10 shown in FIG. 3. FIG. 4 shows a cross section in a plane along an optical path of light emitted from a body part 101 shown in FIG. 3.

As shown in FIG. 3, the projection apparatus 10 comprises the body part 101 and the optical unit 106 that is provided to protrude from the body part 101. In the configuration shown in FIG. 3, the operation reception portion 2, the control device 4, and the light source 21, the optical modulation portion 22, and the control circuit 24 in the projection portion 1 are provided in the body part 101. The projection optical system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, configured to be interchangeable).

The body part 101 includes a housing 15 (see FIG. 4) in which an opening 15*a* (see FIG. 4) for passing light is formed in a part connected to the optical unit 106.

As shown in FIG. 3, the light source 21 and an optical modulation unit 12 including the optical modulation portion 22 (see FIG. 2) that generates an image by spatially modulating the light emitted from the light source 21 based on input image data are provided inside the housing 15 of the body part 101.

The light emitted from the light source 21 is incident on the optical modulation portion 22 of the optical modulation unit 12 and is spatially modulated and emitted by the optical modulation portion 22.

As shown in FIG. 4, the image formed by the light spatially modulated by the optical modulation unit 12 is incident on the optical unit 106 by passing through the opening 15*a* of the housing 15 and is projected onto the projection object 6 as a projection target object. Accordingly, an image G1 is visible from an observer.

As shown in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 disposed in the hollow portion 2A, a second optical system 31, a reflective member 32, a third optical system 33, and a lens 34 disposed in the hollow portion 3A, a shift mechanism 105, and a projection direction changing mechanism 104.

The first member 102 is a member having, for example, a rectangular cross-sectional outer shape, in which an opening 2*a* and an opening 2*b* are formed in surfaces perpendicular to each other. The first member 102 is supported by the body part 101 in a state in which the opening 2*a* is disposed at a position facing the opening 15*a* of the body part 101. The light emitted from the optical modulation portion 22 of the optical modulation unit 12 of the body part 101 is incident into the hollow portion 2A of the first member 102 through the opening 15*a* and the opening 2*a*.

The incidence direction of the light incident into the hollow portion 2A from the body part 101 will be referred to as a direction X1, the direction opposite to the direction X1 will be referred to as a direction X2, and the direction X1 and the direction X2 will be collectively referred to as a direction X. In FIG. 4, the direction from the front to the back of the page and the opposite direction thereto will be referred to as a direction Z. In the direction Z, the direction from the front to the back of the page will be referred to as a direction Z1, and the direction from the back to the front of the page will be referred to as a direction Z2.

In addition, the direction perpendicular to the direction X and to the direction Z will be referred to as a direction Y. In the direction Y, the upward direction in FIG. 4 will be referred to as a direction Y1, and the downward direction in FIG. 4 will be referred to as a direction Y2. In the example in FIG. 4, the projection apparatus 10 is disposed such that the direction Y2 is the vertical direction.

The projection optical system 23 shown in FIG. 2 is composed of the first optical system 121, the reflective member 122, the second optical system 31, the reflective member 32, the third optical system 33, and the lens 34. An optical axis K of the projection optical system 23 is shown in FIG. 4. The first optical system 121, the reflective member 122, the second optical system 31, the reflective member 32, the third optical system 33, and the lens 34 are disposed in this order from the optical modulation portion 22 side along the optical axis K.

The first optical system 121 includes at least one lens and guides the light that is incident on the first member 102 from the body part 101 and travels in the direction X1 to the reflective member 122.

The reflective member 122 reflects the light incident from the first optical system 121 in the direction Y1. The reflective member 122 is composed of, for example, a mirror. In the first member 102, the opening 2*b* is formed on the optical path of light reflected by the reflective member 122, and the reflected light travels to the hollow portion 3A of the second member 103 by passing through the opening 2*b*.

The second member 103 is a member having an approximately T-shaped cross-sectional outer shape, in which an opening 3*a* is formed at a position facing the opening 2*b* of the first member 102. The light that has passed through the opening 2*b* of the first member 102 from the body part 101 is incident into the hollow portion 3A of the second member 103 through the opening 3*a*. The first member 102 and the second member 103 may have any cross-sectional outer shape and are not limited to the above.

The second optical system 31 includes at least one lens and guides the light incident from the first member 102 to the reflective member 32.

The reflective member 32 reflects the light incident from the second optical system 31 in the direction X2 and guides the light to the third optical system 33. The reflective member 32 is composed of, for example, a mirror.

The third optical system 33 includes at least one lens and guides the light reflected by the reflective member 32 to the lens 34.

The lens 34 is disposed at an end part of the second member 103 on the direction X2 side in a form of closing the opening 3*c* formed at this end part. The lens 34 projects the light incident from the third optical system 33 onto the projection object 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to the disposition position shown in FIG. 4 as long as the projection direction changing mechanism 104 can rotate the optical system. Furthermore, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be able to change a position of the first member 102 in the direction Y with respect to the body part 101. The shift mechanism 105 may manually move the first member 102 or electrically move the first member 102.

FIG. 4 shows a state in which the first member 102 is moved as far as possible to the direction Y1 side by the shift mechanism 105. By moving the first member 102 in the direction Y2 by the shift mechanism 105 from the state shown in FIG. 4, the relative position between the center of the image (in other words, the center of the display surface) formed by the optical modulation portion 22 and the optical axis K changes, and the image G1 projected onto the projection object 6 can be shifted (translated) in the direction Y2.

The shift mechanism 105 may be a mechanism that moves the optical modulation portion 22 in the direction Y instead of moving the optical unit 106 in the direction Y. Even in this case, the image G1 projected onto the projection object 6 can be moved in the direction Y2.

<Appearance of Image Processing Apparatus 50>

Figure 5:
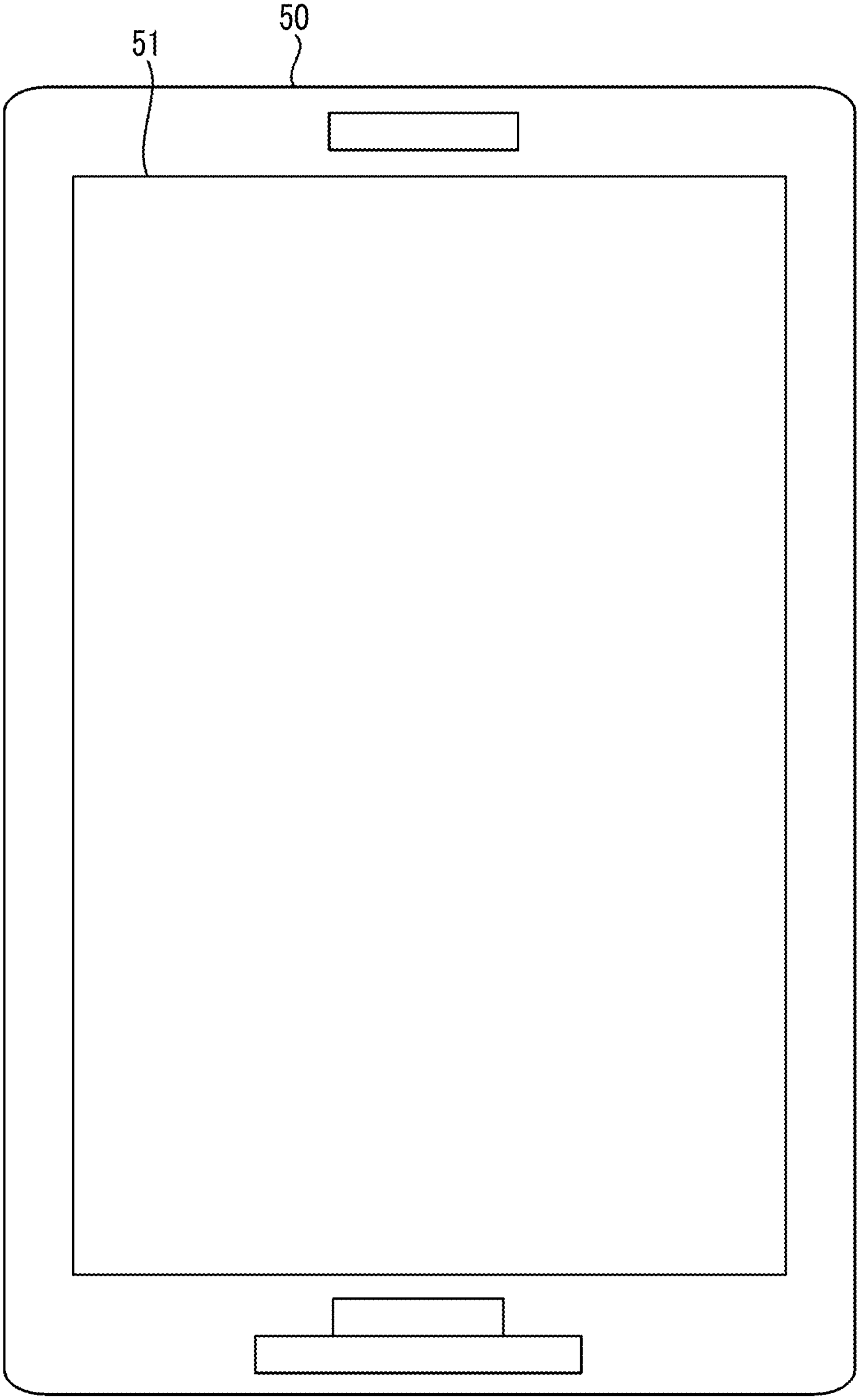
FIG. 5 is a diagram showing an example of an appearance of an image processing apparatus 50.

FIG. 5 is a diagram showing an example of an appearance of an image processing apparatus 50. The image processing apparatus 50 is a tablet terminal having a touch panel 51. The touch panel 51 is a display that allows a touch operation. The image processing apparatus 50 displays, on the touch panel 51, a installation support image for supporting installation of the projection apparatus 10 in a space.

Specifically, the image processing apparatus 50 displays, as a installation support image, a second image in which an image of a virtual projection surface, which is a virtual projection surface, and an image of a virtual projection apparatus, which is a virtual projection apparatus, are superimposed on a first image obtained by imaging the space in which the projection apparatus 10 is installed and performs the projection.

<Hardware Configuration of Image Processing Apparatus 50>

Figure 6:
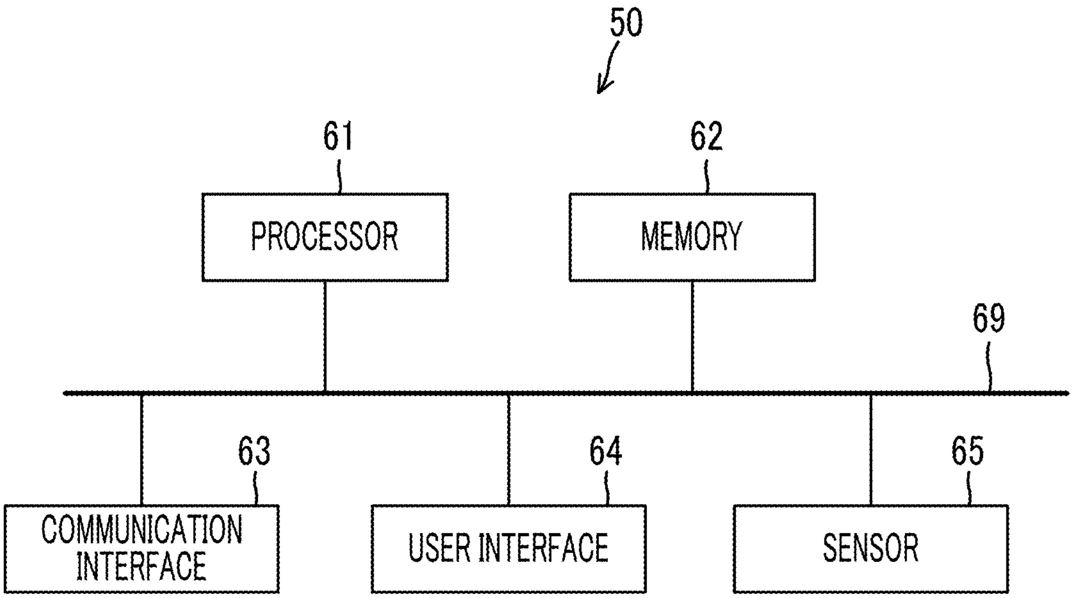
FIG. 6 is a diagram showing an example of a hardware configuration of the image processing apparatus 50.

FIG. 6 is a diagram showing an example of a hardware configuration of the image processing apparatus 50. For example, as shown in FIG. 6, the image processing apparatus ratus 50 shown in FIG. 5 comprises a processor 61, a memory 62, a communication interface 63, a user interface 64, and a sensor 65. The processor 61, the memory 62, the communication interface 63, the user interface 64, and the sensor 65 are connected by, for example, a bus 69.

The processor 61 is a circuit that performs signal processing, and is, for example, a CPU that controls the entire image processing apparatus 50. The processor 61 may be implemented by other digital circuits such as an FPGA and a digital signal processor (DSP). The processor 61 may also be implemented by combining a plurality of digital circuits.

For example, the memory 62 includes a main memory and an auxiliary memory. For example, the main memory is a random-access memory (RAM). The main memory is used as a work area of the processor 61.

The auxiliary memory is, for example, a non-volatile memory such as a magnetic disk or a flash memory. The auxiliary memory stores various programs for operating the image processing apparatus 50. The programs stored in the auxiliary memory are loaded into the main memory and executed by the processor 61.

In addition, the auxiliary memory may include a portable memory that can be detached from the image processing apparatus 50. Examples of the portable memory include a memory card such as a universal serial bus (USB) flash drive or a secure digital (SD) memory card, and an external hard disk drive.

The communication interface 63 is a communication interface for communicating with apparatuses outside the image processing apparatus 50. The communication interface 63 includes at least any of a wired communication interface for performing wired communication or a wireless communication interface for performing wireless communication. The communication interface 63 is controlled by the processor 61.

The user interface 64 includes, for example, an input device that receives an operation input from the user, and an output device that outputs information to the user. The input device can be implemented by, for example, a key (for example, a keyboard) or a remote controller. The output device can be implemented by, for example, a display or a speaker. In the image processing apparatus 50 shown in FIG. 5, the input device and the output device are implemented by the touch panel 51. The user interface 64 is controlled by the processor 61. The image processing apparatus 50 receives various types of designation from the user using the user interface 64.

The sensor 65 includes an imaging apparatus that includes an imaging optical system and an imaging element and that can perform imaging, a space recognition sensor that can three-dimensionally recognize a space around the image processing apparatus 50, and the like. For example, the imaging apparatus includes an imaging apparatus provided on a rear surface of the image processing apparatus 50 shown in FIG. 5.

The space recognition sensor is, as an example, a light detection and ranging (LiDAR) sensor of performing irradiation with laser light, measuring a time taken until the laser light of irradiation hits an object and reflects back, and measuring a distance and a direction to the object. However, the space recognition sensor is not limited thereto and can be various sensors such as a radar that emits radio waves, and an ultrasonic sensor that emits ultrasound waves.

<Physical Space in Which Image Processing Apparatus 50 is Used>

Figure 7:
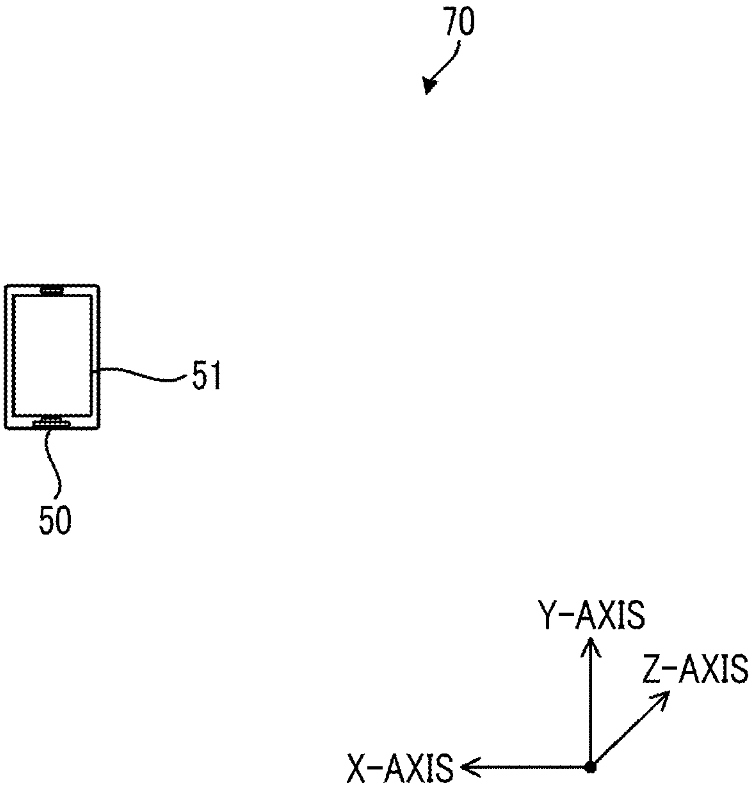
FIG. 7 is a diagram showing an example of a physical space in which the image processing apparatus 50 is used.

FIG. 7 is a diagram showing an example of a physical space in which the image processing apparatus 50 is used. As shown in FIG. 7, for example, the user of the image processing apparatus 50 brings the image processing apparatus 50 into a physical space 70 that is a physical space where the projection apparatus 10 is to be installed.

The image processing apparatus 50 recognizes the physical space 70 by the space recognition sensor. Specifically, the image processing apparatus 50 recognizes the physical space 70 by a world coordinate system including an X-axis, a Y-axis, and a Z-axis, in which the X-axis is one horizontal direction in the physical space 70, the Y-axis is a direction of gravitational force in the physical space 70, and the Z-axis is a direction orthogonal to the X-axis and to the Y-axis in the physical space 70. Further, the image processing apparatus 50 displays a captured image based on imaging data obtained by imaging using the imaging apparatus on the touch panel 51 as a through-image (live view) to the user. The imaging data is an example of the first image data. The captured image is an example of the first image.

<Disposition in Case in Which Surface Serving as Reference for Position and Orientation of Virtual Projection Surface is Not Present>

In a case in which a surface that serves as a reference for the position and the orientation of the virtual projection surface, such as a wall or a projection screen, is present in the physical space 70, the position and the orientation of the virtual projection surface can be relatively easily determined by using information on the surface. In addition, the position and the orientation of the virtual projection apparatus can be determined by obtaining and presenting the installable range of the virtual projection apparatus from the virtual projection surface and by allowing the user to designate the position within the installable range. Meanwhile, in a case in which there is no surface that serves as the reference for the position and the orientation of the virtual projection surface, it is difficult to determine the positions and the orientations of the virtual projection surface and the virtual projection apparatus. On the other hand, according to the present example, even in a case in which the surface that serves as the reference for the position and the orientation of the virtual projection surface is not present, it is possible to efficiently determine the disposition of the virtual projection apparatus and the virtual projection surface.

State in which Orientation of Virtual Projection Surface is not Determined>

Figure 8:
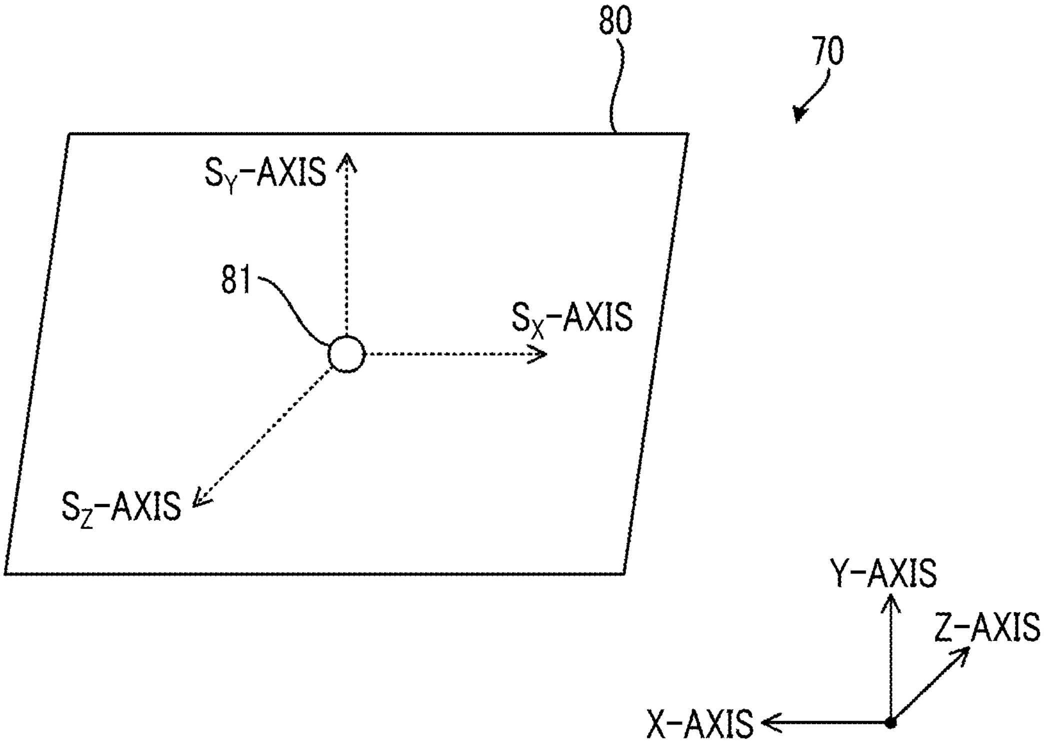
FIG. 8 is a diagram showing an example of a state in which an orientation of a virtual projection surface is not determined.

FIG. 8 is a diagram showing an example of a state in which an orientation of a virtual projection surface is not determined. The virtual projection surface installation position 81 is an installation position of the virtual projection surface 80, which is the virtual object of the virtual projection surface 11, in the physical space 70. For example, the virtual projection surface installation position 81 is one point included in the virtual projection surface 80. In the example of FIG. 8, the virtual projection surface installation position 81 is a center point in the rectangular virtual projection surface 80. Meanwhile, the virtual projection surface installation position 81 need not be included in the virtual projection surface 80 as long as the virtual projection surface installation position 81 is a position that defines the position of the virtual projection surface 80.

A lateral direction of the virtual projection surface 80 is defined as an $S_X$-axis, a vertical direction of the virtual projection surface 80 is defined as an $S_Y$-axis, and a direction perpendicular to the virtual projection surface 80 is defined as an $S_Z$-axis. In a case in which only the virtual projection surface installation position 81 of the virtual projection surface 80 in the physical space 70 is determined, a state in which how to set the $S_X$-axis, the $S_Y$-axis, and the $S_Z$-axis with respect to the X-axis, the Y-axis, and the Z-axis of the world coordinate system, respectively, is not determined, that is, a state in which the orientation of the virtual projection surface 80 is not determined, is set.

<Determination of Orientation of Virtual Projection Apparatus by Determination of Orientation of Virtual Projection Surface 80>

Figure 9:
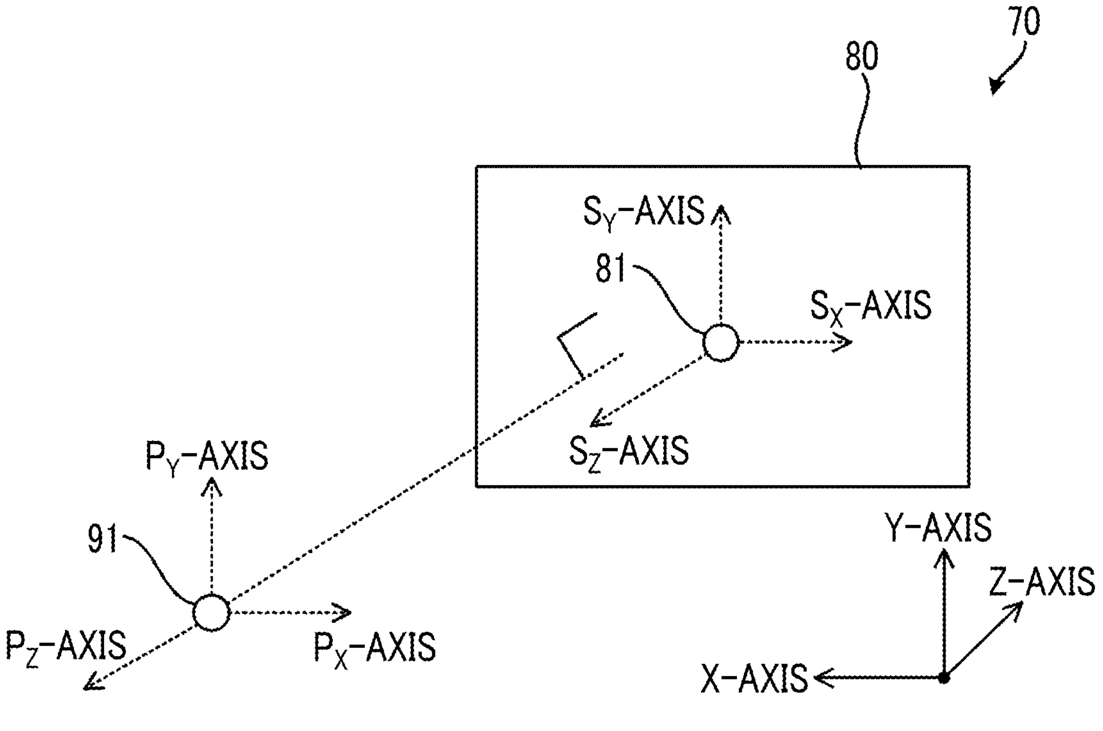
FIG. 9 is a diagram showing an example of determination of an orientation of a virtual projection apparatus by determination of an orientation of a virtual projection surface 80.

FIG. 9 is a diagram showing an example of determination of an orientation of a virtual projection apparatus by determination of an orientation of a virtual projection surface 80. The virtual projection apparatus installation position 91 is an installation position of the virtual projection apparatus, which is the virtual object of the virtual projection apparatus 10, in the physical space 70. For example, the virtual projection apparatus installation position 91 is one point included in the virtual projection apparatus. As an example, the virtual projection apparatus installation position 91 is a position corresponding to the projection portion 1 (for example, the lens 34) of the projection apparatus 10. Meanwhile, the virtual projection apparatus installation position 91 need not be included in the virtual projection apparatus as long as the virtual projection apparatus installation position 91 is a position that defines the position of the virtual projection apparatus.

A vertical direction of the virtual projection apparatus is defined as a $P_Y$-axis, a lateral direction of the virtual projection apparatus is defined as a $P_X$-axis, and a front-rear direction (projection direction) of the virtual projection apparatus is defined as a $P_Z$-axis. In a case in which the virtual projection surface installation position 81 and the orientation of the virtual projection surface 80 are determined, the orientation of the virtual projection apparatus can be determined by setting the $P_Y$-axis of the virtual projection apparatus to the same orientation as the $S_Y$-axis of the virtual projection surface 80 and setting the $P_Z$-axis of the virtual projection apparatus to the same orientation as the $S_Z$-axis of the virtual projection surface 80.

In a case in which the orientation of the virtual projection apparatus is determined, a projection distance D from the virtual projection apparatus to the virtual projection surface 80 can be determined. The size (the lateral width and the vertical width) of the virtual projection surface 80 can be determined based on the projection distance D.

<Designation Method for Position in Physical Space 70>

Figure 10:
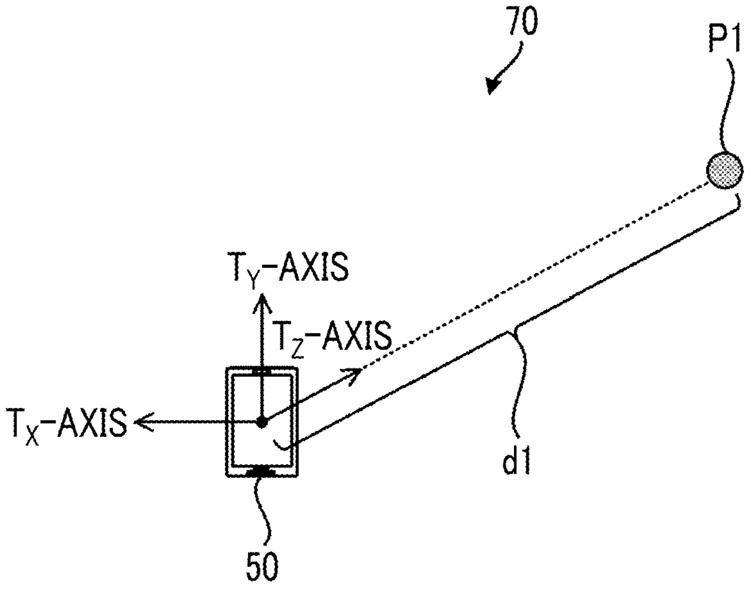
FIG. 10 is a diagram showing an example of a designation method for a position in a physical space 70.

FIG. 10 is a diagram showing an example of a designation method for a position in a physical space 70. A three-dimensional orthogonal coordinate system with a position of a camera (image processing apparatus 50) that performs imaging and display of a captured image as a center is defined as $T_X$ for a lateral direction of the camera, $T_Y$ for a vertical direction of the camera, and $T_Z$ for a depth direction of the camera.

The image processing apparatus 50 displays the position designation image via the touch panel 51. The position designation image is an image in which an image of a position object P1 is superimposed on the captured image such that a virtual position object P1 (for example, a sphere) can be seen to exist at a position moved by a distance d1 from the camera position to $T_Z$ in the physical space 70. In addition, the image processing apparatus 50 receives an operation of providing an instruction to change the distance d1 from the user.

As a result, for example, the user adjusts the position and the orientation of the image processing apparatus 50 such that the position to be designated in the image processing apparatus 50 is positioned on a straight line connecting the camera position and the position object P1 by causing the imaging apparatus of the image processing apparatus 50 to direct to the position to be designated in the physical space 70 while viewing the position designation image displayed on the touch panel 51 of the image processing apparatus 50. In addition, the user adjusts the distance d1 such that the position to be designated and the position object P1 coincide with each other in the physical space 70 by operating the image processing apparatus 50. The user performs the instruction position determination operation with respect to the image processing apparatus 50 in a state in which the position to be designated and the position object P1 coincide with each other in the physical space 70.

In a case in which the image processing apparatus 50 receives the instruction position determination operation, the image processing apparatus 50 determines the position of the position object P1 at that point in time as the position designated by the user in the physical space 70. Accordingly, the user can designate any position in the physical space 70 as, for example, the virtual projection surface installation position 81 or the virtual projection apparatus installation position 91 to the image processing apparatus 50.

<Virtual Projection Apparatus Installation Position 91, Virtual Projection Surface Installation Position 81, and Reference Point>

Figure 11:
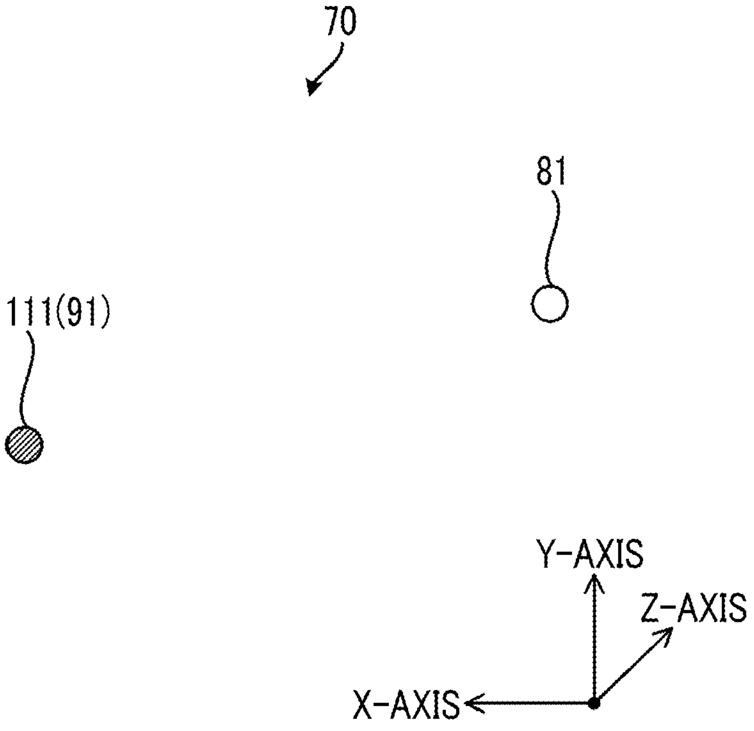
FIG. 11 is a diagram showing an example of a virtual projection apparatus installation position 91, a virtual projection surface installation position 81, and a reference point.

FIG. 11 is a diagram showing an example of a virtual projection apparatus installation position 91, a virtual projection surface installation position 81, and a reference point. The image processing apparatus 50 receives designation of the virtual projection apparatus installation position 91, the virtual projection surface installation position 81, and the reference point 111 from the user, for example, by the designation method shown in FIG. 10.

The virtual projection surface installation position 81 is a first position corresponding to the position of the virtual projection surface 80 in the physical space 70. The reference point 111 is a second position that serves as a reference for the orientation of the virtual projection surface 80, and is a position that is not on a plane including the virtual projection surface 80, in the physical space 70. The reference point 111 is, for example, the virtual projection apparatus installation position 91. In this case, the image processing apparatus 50 needs only receive the position designated as the virtual projection apparatus installation position 91 as the reference point 111, and need not receive the designation of the reference point 111 separately from the position of the virtual projection apparatus installation position 91.

<Example of Positional Relationship Between Virtual Projection Surface Installation Position 81 and Reference Point 111>

Figure 12:
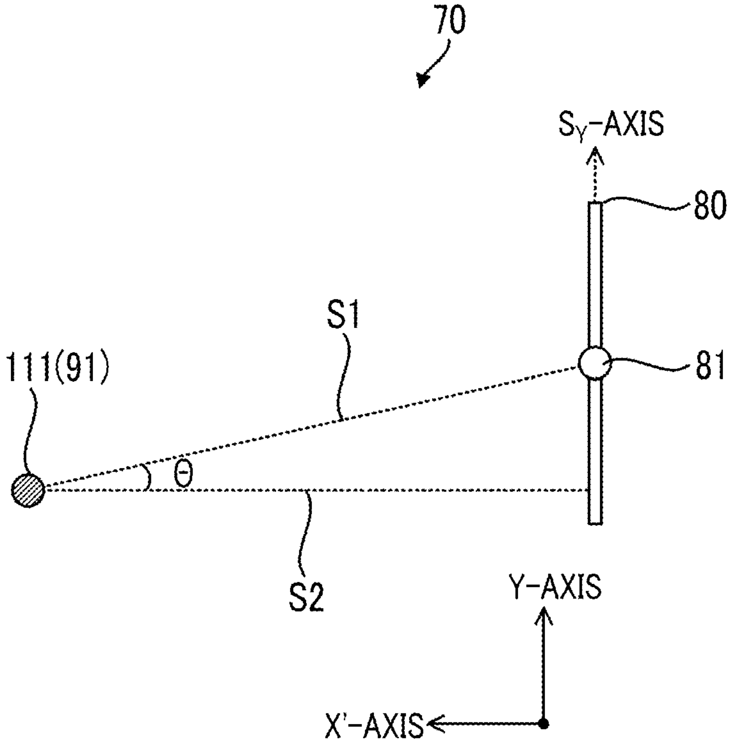
FIG. 12 is a diagram showing a first example of a positional relationship between the virtual projection surface installation position 81 and a reference point 111.
Figure 13:
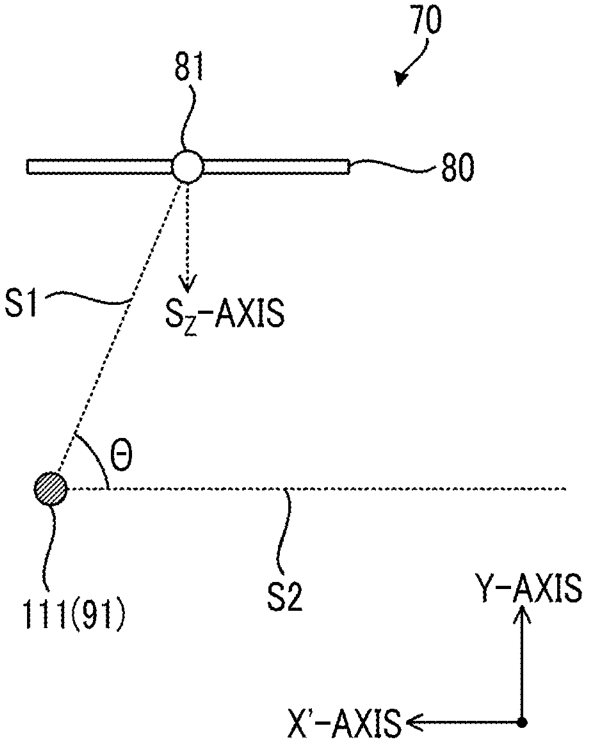
FIG. 13 is a diagram showing a second example of the positional relationship between the virtual projection surface installation position 81 and the reference point 111.

FIG. 12 is a diagram showing a first example of a positional relationship between the virtual projection surface installation position 81 and a reference point 111. FIG. 13 is a diagram showing a second example of the positional relationship between the virtual projection surface installation position 81 and the reference point 111.

A plane passing through the virtual projection surface installation position 81 and through the reference point 111, which are designated by the user, and parallel to the direction of gravitational force (Y-axis) of the physical space 70 is set as an installation position plane. As the coordinate axes in the installation position plane, the same Y-axis as the Y-axis in the physical space 70 and an X'-axis perpendicular to the Y-axis are set. The Y-axis in the installation position plane is a vertical direction, and the X'-axis in the installation position plane is a horizontal direction.

The first angle Θ is an angle formed by a first line segment S1 connecting the reference point 111 (second position) and the virtual projection surface installation position 81 (first position) and a second line segment S2 passing through the reference point 111 and parallel to the X'-axis, in the installation position plane. That is, the first angle Θ is an angle formed by the first line segment S1 connecting the reference point 111 (second position) and the virtual projection surface installation position 81 (first position) and a plane that includes the reference point 111 and that is horizontal, in the physical space 70.

In the example of FIG. 12, it is assumed that the first angle Θ is relatively small and smaller than the threshold value. In this case, the image processing apparatus 50 sets the orientation of the virtual projection surface 80 such that the Y-axis of the physical space 70 and the $S_Y$-axis of the virtual projection surface 80 are parallel to each other.

In the example of FIG. 13, it is assumed that the first angle Θ is relatively large and is equal to or larger than the threshold value. In this case, the image processing apparatus 50 sets the orientation of the virtual projection surface 80 such that the Y-axis of the physical space 70 and the $S_Z$-axis of the virtual projection surface 80 are parallel to each other. In the drawing, the Y-axis and the $S_Z$-axis face each other, but the same applies to a case in which the Y-axis and the $S_Z$-axis are in the same orientation (floor projection).

As shown in FIGS. 12 and 13, the image processing apparatus 50 determines the orientation of the virtual projection surface 80 as a surface parallel to the direction of gravitational force (FIG. 12) or a surface perpendicular to the direction of gravitational force (FIG. 13) according to a comparison result between the first angle Θ and the threshold value. Accordingly, the orientation of the virtual projection surface 80 can be determined according to the positional relationship between the virtual projection surface installation position 81 and the reference point 111. The threshold value can be set to 80 degrees as an example, but is not limited thereto and can be set to any value.

<Determination of Orientation of Virtual Projection Surface 80 in Case in Which First Angle Θ is Smaller Than Threshold Value>

Figure 14:
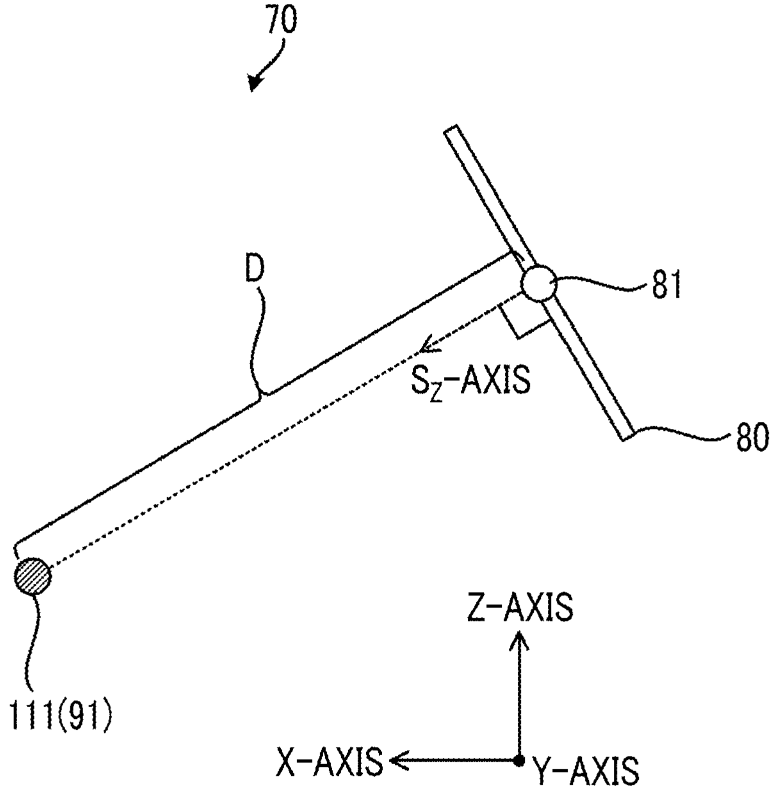
FIG. 14 is a diagram showing an example of the determination of the orientation of the virtual projection surface 80 in a case in which a first angle Θ is smaller than a threshold value.

FIG. 14 is a diagram showing an example of the determination of the orientation of the virtual projection surface 80 in a case in which a first angle Θ is smaller than a threshold value. In a case in which the first angle Θ is smaller than the threshold value, the $S_Y$-axis of the virtual projection surface 80 is determined in the vertical direction as shown in FIG. 12, but the $S_X$-axis and the $S_Z$-axis of the virtual projection surface 80 are in an undetermined state.

In this case, as shown in FIG. 14, the image processing apparatus 50 determines the $S_X$-axis and the $S_Z$-axis of the virtual projection surface 80 such that the $S_Z$-axis of the virtual projection surface 80 faces the reference point 111 in a case of being viewed in a plane perpendicular to the Y-axis. As a result, the orientation of the virtual projection surface 80 is determined.

<Projection Distance D in Case in Which First Angle Θ is Smaller Than Threshold Value>

Figure 15:
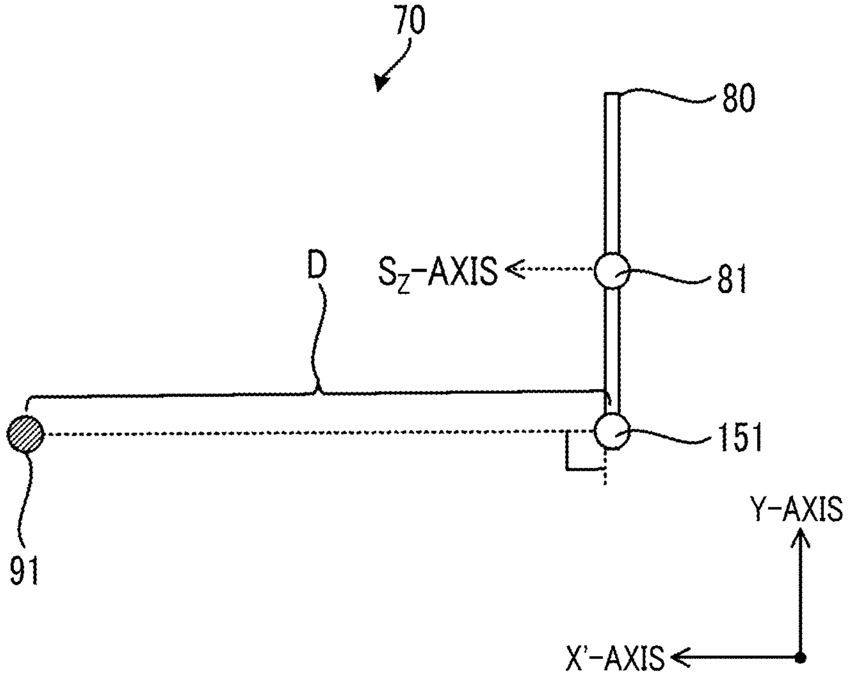
FIG. 15 is a diagram showing an example of a projection distance D in a case in which the first angle Θ is smaller than the threshold value.

FIG. 15 is a diagram showing an example of a projection distance D in a case in which the first angle Θ is smaller than the threshold value. After determining the orientation of the virtual projection surface 80 as shown in FIG. 14, the image processing apparatus 50 calculates an intersection of a straight line passing through the virtual projection apparatus installation position 91 and parallel to the $S_Z$-axis of the virtual projection surface 80 and a plane passing through the virtual projection surface installation position 81 and parallel to the virtual projection surface 80, as a projection center 151 without the lens shift. The image processing apparatus 50 calculates the distance between the projection center 151 without lens shift and the virtual projection apparatus installation position 91 as the projection distance D.

<Determination of Orientation of Virtual Projection Surface 80 in Case in Which First Angle Θ is Equal to or Larger Than Threshold Value>

Figure 16:
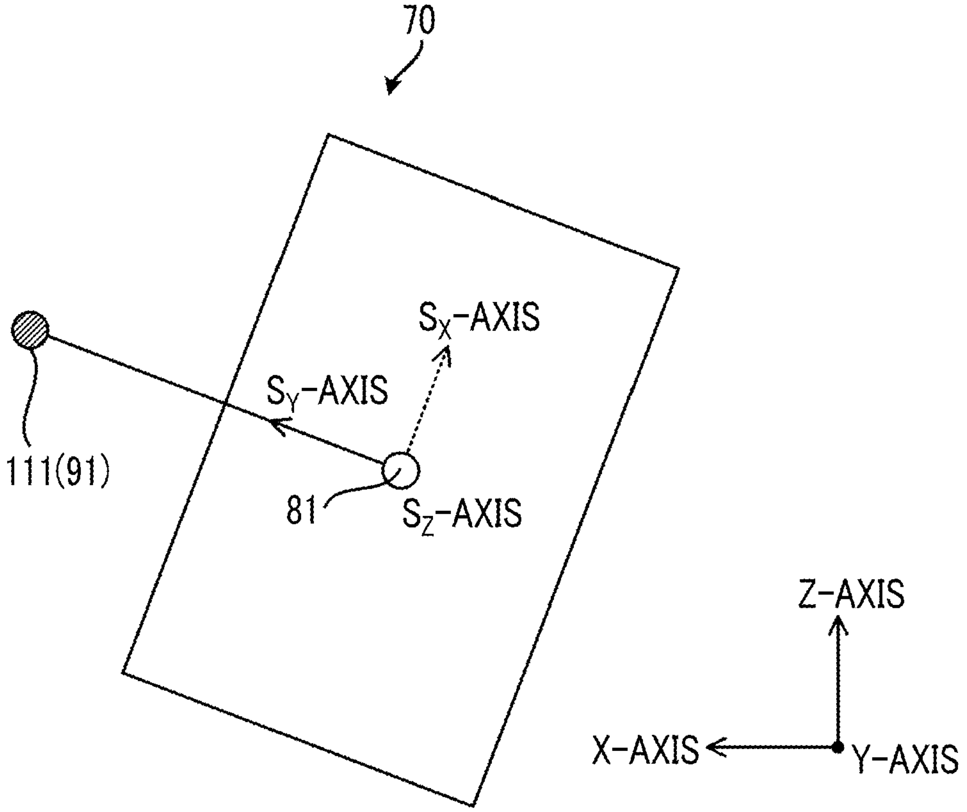
FIG. 16 is a diagram showing an example of the determination of the orientation of the virtual projection surface 80 in a case in which the first angle Θ is equal to or larger than the threshold value.

FIG. 16 is a diagram showing an example of the determination of the orientation of the virtual projection surface 80 in a case in which the first angle Θ is equal to or larger than the threshold value. In a case in which the first angle Θ is equal to or larger than the threshold value, the $S_Z$-axis of the virtual projection surface 80 is determined in the vertical direction as shown in FIG. 13, but the $S_X$-axis and the $S_Y$-axis of the virtual projection surface 80 are in an undetermined state.

In this case, as shown in FIG. 16, the image processing apparatus 50 determines the $S_X$-axis and the $S_Y$-axis of the virtual projection surface 80 such that the $S_Y$-axis of the virtual projection surface 80 faces the reference point 111 in a case of being viewed in a plane perpendicular to the Y-axis. As a result, the orientation of the virtual projection surface 80 is determined.

<Projection Distance D in Case in Which First Angle Θ is Equal to or Larger than Threshold Value>

Figure 17:
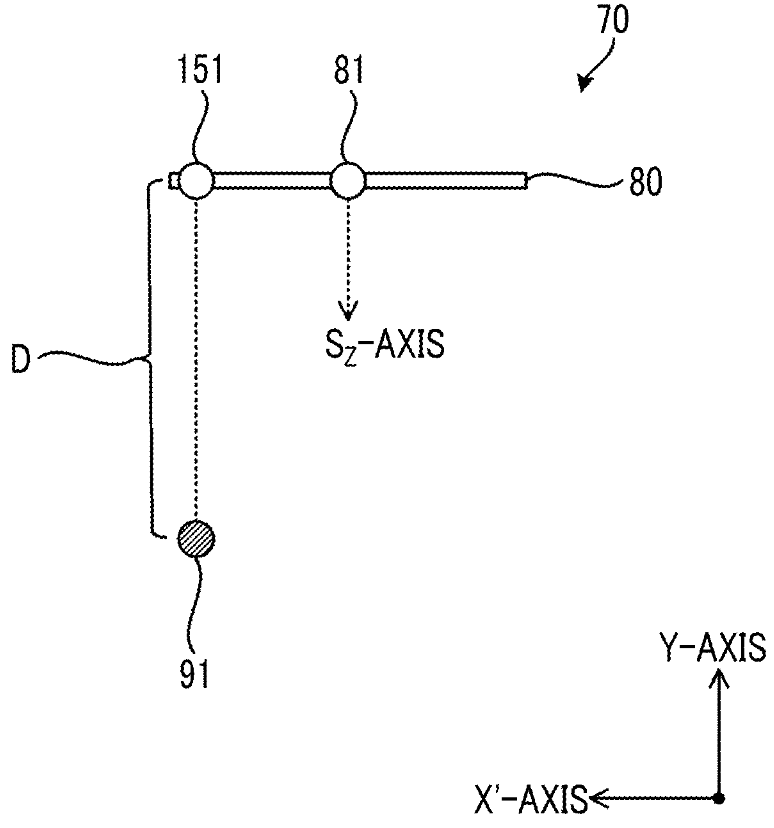
FIG. 17 is a diagram showing an example of the projection distance D in a case in which the first angle Θ is equal to or larger than the threshold value.

FIG. 17 is a diagram showing an example of the projection distance D in a case in which the first angle Θ is equal to or larger than the threshold value. After determining the orientation of the virtual projection surface 80 as shown in FIG. 16, the image processing apparatus 50 calculates an intersection of a straight line passing through the virtual projection apparatus installation position 91 and parallel to the $S_Z$-axis of the virtual projection surface 80 and a plane passing through the virtual projection surface installation position 81 and parallel to the virtual projection surface 80, as a projection center 151 without the lens shift. The image processing apparatus 50 calculates the distance between the projection center 151 without lens shift and the virtual projection apparatus installation position 91 as the projection distance D.

<Processing by Image Processing Apparatus 50>

Figure 18:
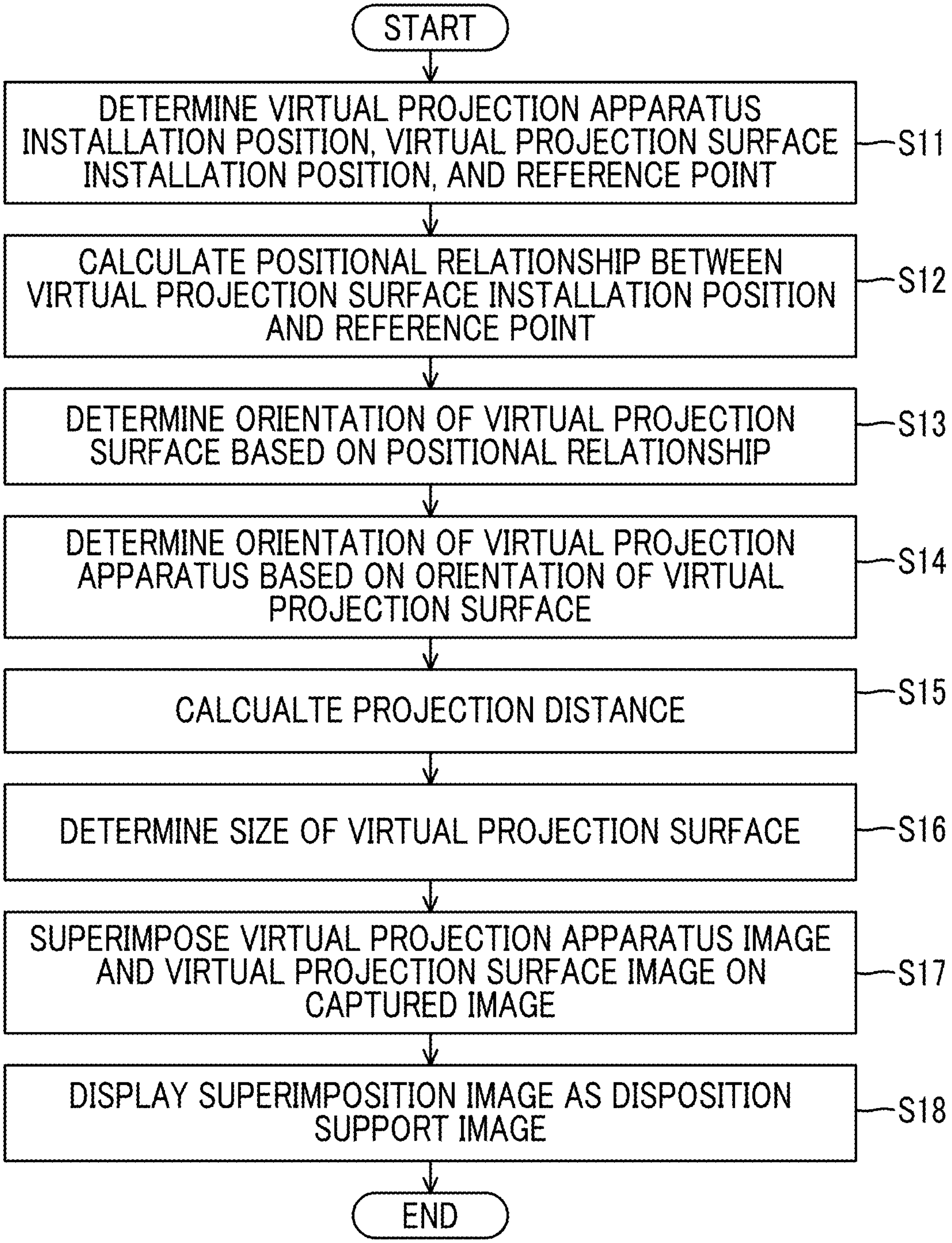
FIG. 18 is a flowchart showing an example of processing by the image processing apparatus 50.

FIG. 18 is a flowchart showing an example of processing by the image processing apparatus 50. For example, the image processing apparatus 50 executes the processing shown in FIG. 18.

First, the image processing apparatus 50 determines the virtual projection apparatus installation position 91, the virtual projection surface installation position 81, and the reference point 111 (step S11). For example, the image processing apparatus 50 receives designation of the virtual projection apparatus installation position 91, the virtual projection surface installation position 81, and the reference point 111 as shown in FIG. 11 from the user by the designation method shown in FIG. 10.

Next, the image processing apparatus 50 calculates a positional relationship between the virtual projection surface installation position 81 and the reference point 111 determined in step S11 (step S12). For example, the image processing apparatus 50 calculates the first angle Θ shown in FIGS. 12 and 13.

Next, the image processing apparatus 50 determines the orientation of the virtual projection surface 80 based on the positional relationship between the virtual projection surface installation position 81 and the reference point 111 calculated in step S12 (step S13). For example, as shown in FIGS. 12 and 13, the image processing apparatus 50 determines which of the $S_Y$-axis and the $S_Z$-axis of the virtual projection surface 80 is set to the same direction as the Y-axis of the physical space 70, based on the magnitude of the first angle Θ (comparison result with the threshold value). In addition, as shown in FIGS. 14 and 16, the image processing apparatus 50 determines the remaining axes of the virtual projection surface 80 to face the reference point 111.

Next, the image processing apparatus 50 determines the orientation of the virtual projection apparatus based on the orientation of the virtual projection surface 80 determined in step S13 (step S14). For example, as described in FIG. 9, the image processing apparatus 50 determines the orientation of the virtual projection apparatus by setting the $P_Y$-axis of the virtual projection apparatus to the same orientation as the $S_Y$-axis of the virtual projection surface 80 and setting the $P_Z$-axis of the virtual projection apparatus to the same orientation as the $S_Z$-axis of the virtual projection surface 80.

Next, the image processing apparatus 50 calculates the projection distance D between the virtual projection apparatus and the virtual projection surface 80 based on the orientation of the virtual projection apparatus determined in step S14 (step S15). For example, as shown in FIGS. 15 and 17, the image processing apparatus 50 calculates the distance between the projection center 151 without lens shift and the virtual projection apparatus installation position 91 as the projection distance D.

Next, the image processing apparatus 50 determines the size of the virtual projection surface 80 based on the projection distance D calculated in step S15 (step S16). For example, the image processing apparatus 50 determines the lateral width and the vertical width of the virtual projection surface 80 based on the specification (for example, the angle of view or the aspect ratio) of the projection apparatus 10 represented by the virtual projection apparatus and on the projection distance D.

By the processing so far, the position (virtual projection apparatus installation position 91) and the orientation of the virtual projection apparatus, and the position (virtual projection surface installation position 81), the orientation, and the size of the virtual projection surface 80 are determined. Next, the image processing apparatus 50 uses this information to superimpose a virtual projection apparatus image representing the virtual projection apparatus and a virtual projection surface image representing the virtual projection surface 80 on the captured image represented by the imaging data obtained by imaging performed by the image processing apparatus 50 in the physical space 70 (step S17).

Next, the image processing apparatus 50 displays the superimposition image obtained in step S17 on the touch panel 51 as the installation support image (step S18). Accordingly, the user can see the installation support image that virtually shows a state in which the projection apparatus 10 and the projection surface 11 are disposed at the position and the orientation determined based on the virtual projection apparatus installation position 91 and the virtual projection surface installation position 81 which are designated in step S11, in the physical space 70. The installation support image is an example of the second image. The installation support image data representing the installation support image is an example of the second image data.

In addition, the image processing apparatus 50 may re-execute steps S17 and S18 each time the position or the orientation of the image processing apparatus 50 in the physical space 70 is changed (that is, each time the captured image is changed). That is, the image processing apparatus 50 may update the superimposed virtual projection apparatus image and virtual projection surface image and the disposition thereof in the installation support image to be displayed in accordance with the changed imaging data.

<Recalculation of Projection Distance D in Case in Which User Changes Orientation of Virtual Projection Surface 80>

Figure 19:
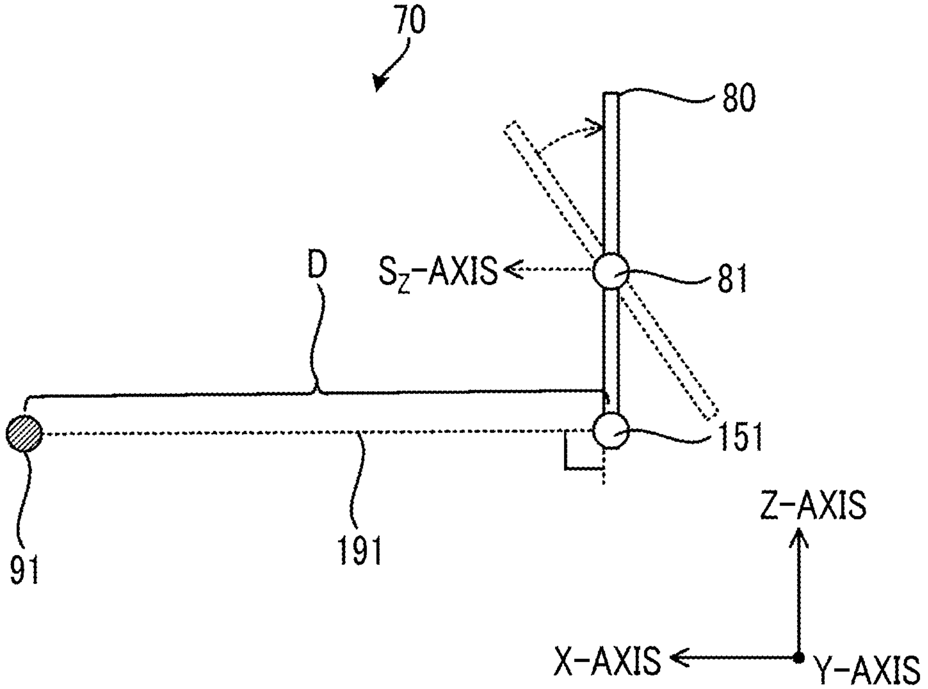
FIG. 19 is a diagram showing an example of recalculation of the projection distance D in a case in which a user changes the orientation of the virtual projection surface 80.

FIG. 19 is a diagram showing an example of recalculation of the projection distance D in a case in which a user changes the orientation of the virtual projection surface 80. For example, in a case in which the image processing apparatus 50 receives an instruction operation of changing the orientation of the virtual projection surface 80 from the user after the processing shown in FIG. 18, the image processing apparatus 50 changes the orientation of the virtual projection surface 80 based on the instruction operation received from the user, changes the size of the virtual projection surface 80 based on the changed orientation of the virtual projection surface 80 and on the virtual projection apparatus installation position 91, and updates the installation support image (installation support image data) to be displayed.

For example, FIG. 19 shows the virtual projection surface 80 of which the orientation is changed. A perpendicular line 191 is a perpendicular line drawn from the virtual projection apparatus installation position 91 with respect to a plane passing through the virtual projection surface installation position 81 and parallel to the changed virtual projection surface 80. The image processing apparatus 50 calculates the length of the perpendicular line 191 again as a new projection distance D. In addition, the image processing apparatus 50 determines the size of the virtual projection surface 80 again based on the calculated projection distance D.

The image processing apparatus 50 updates the virtual projection surface image superimposed on the captured image based on the changed orientation of the virtual projection surface 80 and on the size of the virtual projection surface 80 determined again, and displays the installation support image (second image) in which the virtual projection surface image is updated.

Although the processing in a case of changing the orientation of the virtual projection surface 80 by the user has been described, for example, in a case in which the image processing apparatus 50 receives an instruction operation of changing the position of the virtual projection surface 80 in an $S_Z$ direction from the user after the processing shown in FIG. 18, the image processing apparatus 50 may change the position of the virtual projection surface 80 in the $S_Z$ direction based on the instruction operation received from the user. In this case, the image processing apparatus 50 calculates the projection distance D based on the changed position of the virtual projection surface 80 in the $S_Z$ direction and on the virtual projection apparatus installation position 91, changes the size of the virtual projection surface 80 based on the calculated projection distance D, and updates the installation support image (installation support image data) to be displayed.

<Determination of Position of Virtual Projection Surface 80 Based on Detection of Surface Serving as Reference for Position of Virtual Projection Surface 80>

Figure 20:
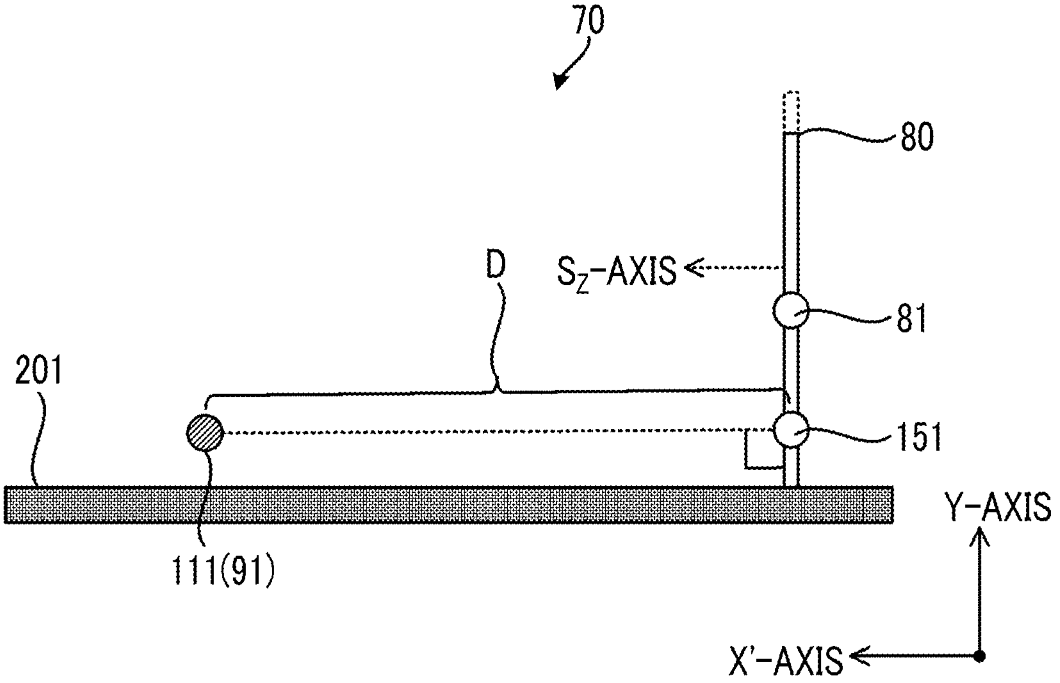
FIG. 20 is a diagram showing an example of determination of a position of the virtual projection surface 80 based on detection of a surface serving as a reference for the position of the virtual projection surface 80.

FIG. 20 is a diagram showing an example of determination of a position of the virtual projection surface 80 based on detection of a surface serving as a reference for the position of the virtual projection surface 80. In a case in which the image processing apparatus 50 detects a line or a surface serving as the reference for the position of the virtual projection surface 80 in the physical space 70, the image processing apparatus 50 may determine the position of the virtual projection surface 80 on the plane including the virtual projection surface 80 based on the position of the detected line or surface and display the installation support image.

For example, in the example of FIG. 20, it is assumed that a floor surface 201 is present in the physical space 70 and the image processing apparatus 50 detects the floor surface 201 by the space recognition sensor. The image processing apparatus 50 recognizes that the floor surface 201 is the surface that serves as the reference for the position of the virtual projection surface 80 since the floor surface 201 is perpendicular to the orientation of the virtual projection surface 80.

In this case, the image processing apparatus 50 changes the virtual projection surface installation position 81 determined in step S11 such that an end part (lower end) of the virtual projection surface 80 is in contact with the floor surface 201 based on the size of the virtual projection surface 80 determined in step S16, between step S16 and step S17 shown in FIG. 18.

Accordingly, in a state in which the virtual projection surface 80 is translated downward as compared with a case in which the virtual projection surface installation position 81 is not changed, the virtual projection apparatus image and the virtual projection surface image are superimposed on the captured image in step S17. The determination of the position of the virtual projection surface 80 based on the detection of the surface serving as the reference for the position of the virtual projection surface 80 may be executed even in a case in which steps S17 and S18 are re-executed due to the change in the position or the orientation of the image processing apparatus 50 in the physical space 70, as described above.

Here, a case in which the virtual projection surface installation position 81 is changed such that the end part of the virtual projection surface 80 is in contact with the detected surface (floor surface 201) has been described. However, the image processing apparatus 50 may change the virtual projection surface installation position 81 such that the distance between the detected surface (floor surface 201) and the end part of the virtual projection surface 80 is a predetermined offset value. The offset value may be predetermined or may be able to be designated by the user.

<Determination of Provisional Orientation of Virtual Projection Surface 80 Based on Camera Position>

While a case in which the virtual projection apparatus installation position 91 is used as the reference point 111 that serves as the reference for the orientation of the virtual projection surface 80 has been described, the image processing apparatus 50 may provisionally determine the orientation of the virtual projection surface 80 by using the position (camera position) of the image processing apparatus 50 before determining the final orientation of the virtual projection surface 80 based on the virtual projection apparatus installation position 91, and may display the installation support image based on the orientation of the virtual projection surface 80.

Figure 21:
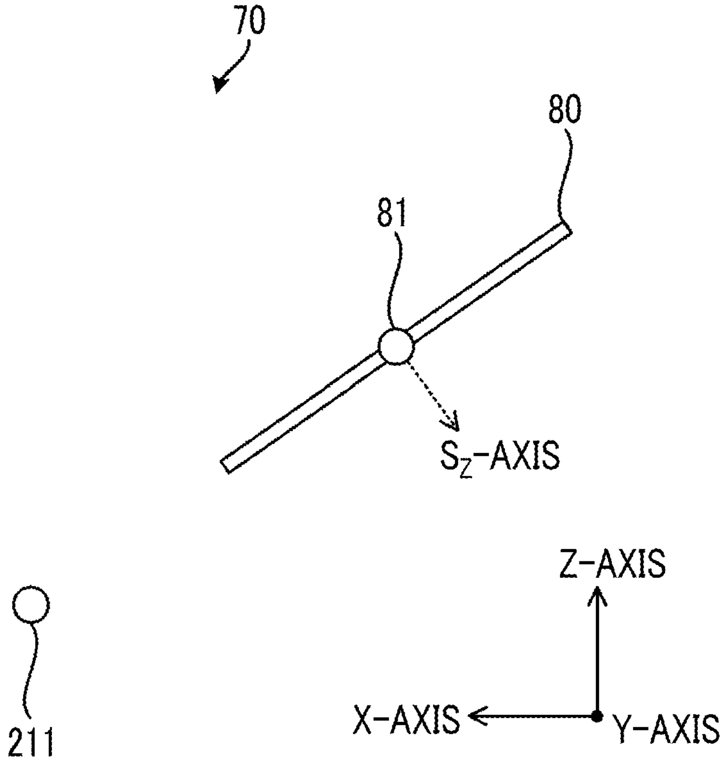
FIG. 21 is a diagram (part 1) showing an example of determination of a provisional orientation of the virtual projection surface 80 based on a camera position in a case in which the first angle Θ is smaller than the threshold value.
Figure 22:
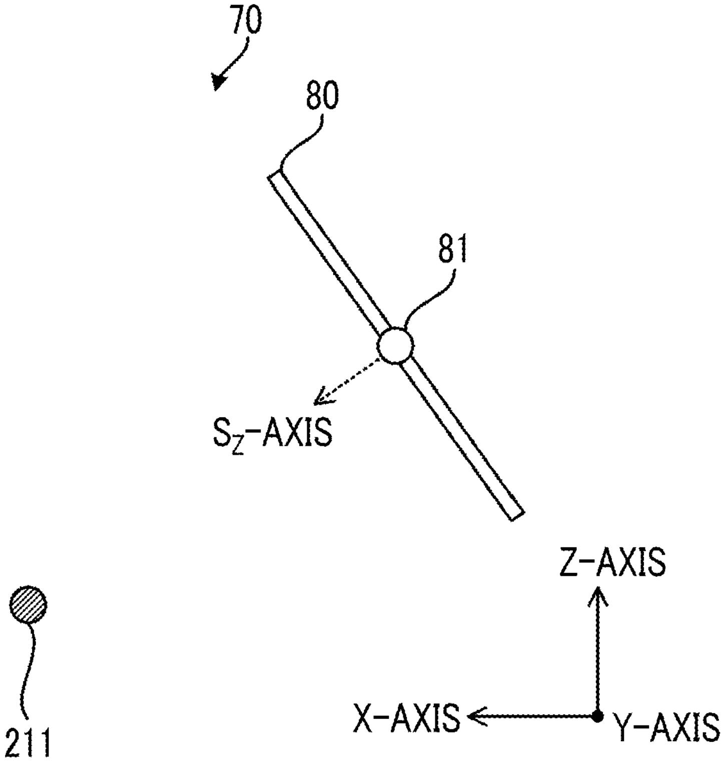
FIG. 22 is a diagram (part 2) showing the example of the determination of the provisional orientation of the virtual projection surface 80 based on the camera position in a case in which the first angle Θ is smaller than the threshold value.

FIGS. 21 and 22 are diagrams showing the example of the determination of the provisional orientation of the virtual projection surface 80 based on the camera position in a case in which the first angle Θ is smaller than the threshold value. In a case in which the first angle Θ is smaller than the threshold value, the $S_Y$-axis of the virtual projection surface 80 is determined in the vertical direction as shown in FIG. 12, but the $S_X$-axis and the $S_Z$-axis of the virtual projection surface 80 are in an undetermined state. A camera position 211 is a position of the image processing apparatus 50.

In the example of FIG. 21, an angle formed by the $S_Z$-axis of the virtual projection surface 80 and a line segment connecting the virtual projection surface installation position 81 and the camera position 211 is large, and the virtual projection surface 80 is difficult to be seen from the camera position 211. In such a case, the image processing apparatus 50 provisionally determines the $S_X$-axis and the $S_Z$-axis of the virtual projection surface 80 such that the $S_Z$-axis faces the camera position 211 in a case of being viewed in a plane perpendicular to the Y-axis, for example, according to the operation of the user or automatically.

As a result, as shown in FIG. 22, the orientation of the virtual projection surface 80 is the orientation based on the camera position 211, and the virtual projection surface 80 is easily visible from the camera position 211. For example, the image processing apparatus 50 repeatedly executes the update of the orientation of the virtual projection surface 80 shown in FIGS. 21 and 22 in accordance with the movement of the user (movement of the camera position 211). In a case in which the image processing apparatus 50 receives an operation of stopping the update of the orientation of the virtual projection surface 80 from the user, the image processing apparatus 50 sets the camera position 211 at that point in time or the point designated by the user as the reference point 111. In this case, the virtual projection apparatus installation position 91 may be set before the reference point 111 is set, or may be set after the reference point 111 is set. Accordingly, the virtual projection apparatus installation position 91, the virtual projection surface installation position 81, and the reference point 111 are determined, and thus, the same processing as steps S12 to S18 shown in FIG. 18 is executed. In this way, by provisionally treating the camera position 211 in the same manner as the reference point 111, it is possible to make the virtual projection surface 80 easily visible to the user even in a state in which the reference point 111 is not determined.

The determination of the provisional orientation of the virtual projection surface 80 based on the camera position in a case in which the first angle Θ is smaller than the threshold value has been described, but the image processing apparatus 50 may also determine the provisional orientation of the virtual projection surface 80 based on the camera position in a case in which the first angle Θ is equal to or larger than the threshold value.

As described above, the image processing apparatus 50 may determine the orientation of the virtual projection surface 80 based on the positional relationship between the virtual projection surface installation position 81 and the reference point 111 and on the position of the image processing apparatus 50 (imaging apparatus).

As described above, the processor 61 of the image processing apparatus 50 acquires first image data obtained by imaging the physical space 70 with an imaging apparatus of the sensor 65. In addition, the processor 61 of the image processing apparatus 50 determines the virtual projection surface installation position 81 (first position) corresponding to the position of the virtual projection surface 80 and the reference point 111 (second position) that is not on the plane including the virtual projection surface 80 and that serves as the reference for the orientation of the virtual projection surface 80, in the physical space 70, and determines the orientation of the virtual projection surface 80 based on the positional relationship between the virtual projection surface installation position 81 and the reference point 111 and generates virtual projection surface data representing the virtual projection surface 80. The processor 61 of the image processing apparatus 50 generates second image data representing the second image in which the virtual projection surface 80 is displayed on the first image represented by the first image data, based on the first image data and the virtual projection surface data, and outputs the second image data to the touch panel 51 (output destination).

As a result, even in a case in which the surface that serves as the reference for the position and the orientation of the virtual projection surface, such as a wall or a projection screen, is not present in the physical space 70, the position and the orientation of the virtual projection surface 80 can be easily determined. Therefore, it is possible to efficiently determine the disposition of the virtual projection apparatus and the virtual projection surface 80, and thus it is possible to improve the convenience of the user regarding the disposition of the projection surface 11 and the projection apparatus 10.

MODIFICATION EXAMPLE

Modification examples related to each embodiment will be described.

Modification Example 1

Although a case in which the image processing apparatus 50 is a tablet terminal having a touch panel 51 has been described, the image processing apparatus 50 is not limited to such a configuration. For example, the image processing apparatus 50 may be an information terminal, such as a smartphone or a personal computer.

Modification Example 2

Although the configuration in which the image processing apparatus 50 displays the second image using the touch panel 51 has been described, the image processing apparatus 50 may transmit the generated second image to another apparatus to perform control to display the second image on the other apparatus. In this case, the image processing apparatus 50 may be an apparatus that does not comprise a display device.

Modification Example 3

Although a case in which the captured image representing the physical space 70 is an image obtained by imaging using an imaging apparatus of the image processing apparatus 50 has been described, the captured image may be an image obtained by imaging using an apparatus different from the image processing apparatus 50 and received by the image processing apparatus 50 from the apparatus. In this case, the image processing apparatus 50 may be an apparatus that does not comprise an imaging apparatus.

Modification Example 4

While a case in which the reference point 111 is the virtual projection apparatus installation position 91 has been described, the reference point 111 is not limited to this, and may be a position of the imaging apparatus (image processing apparatus 50), a position of an observer who observes the virtual projection surface 80, or a combination of these positions. Since the position of the imaging apparatus (image processing apparatus 50) is, for example, the origin of the world coordinate system in a case in which the image processing apparatus 50 recognizes the physical space 70, it is not necessary to receive designation from the user. Regarding the position of the observer who observes the virtual projection surface 80, the image processing apparatus 50 receives designation from the user, for example, by the designation method shown in FIG. 10.

Image Processing Program

The image processing method described in the above embodiment can be implemented by executing an image processing program prepared in advance on a computer. This image processing program is recorded in a computer-readable storage medium and is executed by being read from the storage medium by a computer. In addition, this image processing program may be provided in a form of being stored in a non-transitory storage medium, such as a flash memory, or may be provided via a network, such as the Internet. The computer that executes this image processing program may be included in an image processing apparatus, may be included in an electronic apparatus such as a smartphone, a tablet terminal, or a personal computer capable of communicating with the image processing apparatus, or may be included in a server apparatus capable of communicating with the image processing apparatus and the electronic apparatus.

The embodiments and the modification examples can be implemented in combination with each other.

At least the following matters are described in the present specification.

(1)

An image processing apparatus comprising a processor, in which the processor is configured to:

- acquire first image data obtained by imaging a space with an imaging apparatus;
- determine a first position corresponding to a position of a virtual projection surface and a second position serving as a reference for an orientation of the virtual projection surface, in the space;
- determine the orientation of the virtual projection surface based on a positional relationship between the first position and the second position and generate virtual projection surface data representing the virtual projection surface;
- generate second image data representing a second image in which the virtual projection surface is displayed on a first image represented by the first image data, based on the first image data and on the virtual projection surface data; and
- output the second image data to an output destination.

(2)

The image processing apparatus according to (1), in which the second position is a position that is not on a plane including the virtual projection surface.

(3)

The image processing apparatus according to (1) or (2), in which the second position is at least one of an installation position of a virtual projection apparatus corresponding to the virtual projection surface, a position of the imaging apparatus, or a position of an observer who observes the virtual projection surface.

(4)

The image processing apparatus according to any one of (1) to (3), in which the processor is configured to:

- calculate a first angle which is an angle formed by a first line segment connecting the second position and the first position and a plane including the second position and perpendicular or parallel to a direction of gravitational force; and determine the orientation of the virtual projection surface based on a magnitude of the first angle.

(5)

The image processing apparatus according to (4), in which the processor is configured to determine the orientation of the virtual projection surface as a surface parallel to the direction of gravitational force or a surface perpendicular to the direction of gravitational force according to a comparison result between the first angle and a threshold value.

(6)

The image processing apparatus according to any one of (1) to (5), in which the processor is configured to determine the first position and the second position based on an instruction received from a user.

(7)

The image processing apparatus according to any one of (1) to (6), in which the processor is configured to determine the orientation of the virtual projection surface based on the positional relationship and on an installation position of a virtual projection apparatus corresponding to the virtual projection surface.

(8)

The image processing apparatus according to any one of (1) to (6), in which the processor is configured to determine the orientation of the virtual projection surface based on the positional relationship and on a position of the imaging apparatus.

(9)

The image processing apparatus according to any one of (1) to (8), in which the processor is configured to determine a size of the virtual projection surface based on the orientation of the virtual projection surface and on an installation position of a virtual projection apparatus corresponding to the virtual projection surface to generate the virtual projection surface data.

(10)

The image processing apparatus according to (9), in which the processor is configured to:

change the orientation of the virtual projection surface based on a change instruction of the orientation of the virtual projection surface received from a user;

change the size of the virtual projection surface based on the changed orientation of the virtual projection surface and on the installation position of the virtual projection apparatus; and update the virtual projection surface data and the second image data.

(11)

The image processing apparatus according to any one of (1) to (10), in which, in a case in which the processor detects a line or a surface, which serves as a reference for the position of the virtual projection surface, in the space, the processor is configured to generate the virtual projection surface data by determining the position of the virtual projection surface on a plane including the virtual projection surface based on a position of the line or the surface.

(12)

The image processing apparatus according to (11), in which the processor is configured to determine the position of the virtual projection surface such that a distance between the position of the line or the surface and an end part of the virtual projection surface is a predetermined offset value.

(13)

The image processing apparatus according to any one of (1) to (12), in which the processor is configured to:

change the position of the virtual projection surface based on a change instruction of the position of the virtual projection surface in a direction perpendicular to the virtual projection surface, which is received from a user;

change a size of the virtual projection surface based on the changed position of the virtual projection surface and on an installation position of a virtual projection apparatus corresponding to the virtual projection surface; and update the virtual projection surface data and the second image data.

(14)

The image processing apparatus according to any one of (1) to (13), in which the image processing apparatus is provided in an information processing terminal comprising the imaging apparatus and a display device, and the output destination is the display device.

(15)

An image processing method executed by a processor included in an image processing apparatus, the image processing method comprising:

acquiring first image data obtained by imaging a space with an imaging apparatus;

determining a first position corresponding to a position of a virtual projection surface and a second position serving as a reference for an orientation of the virtual projection surface, in the space;

determining the orientation of the virtual projection surface based on a positional relationship between the first position and the second position and generating virtual projection surface data representing the virtual projection surface;

generating second image data representing a second image in which the virtual projection surface is displayed on a first image represented by the first image data, based on the first image data and on the virtual projection surface data; and outputting the second image data to an output destination.

(16)

An image processing program for causing a processor included in an image processing apparatus to execute a process comprising:

acquiring first image data obtained by imaging a space with an imaging apparatus;

determining a first position corresponding to a position of a virtual projection surface and a second position serving as a reference for an orientation of the virtual projection surface, in the space;

determining the orientation of the virtual projection surface based on a positional relationship between the first position and the second position and generating virtual projection surface data representing the virtual projection surface;

generating second image data representing a second image in which the virtual projection surface is displayed on a first image represented by the first image data, based on the first image data and on the virtual projection surface data; and outputting the second image data to an output destination.

Although various embodiments have been described above, it goes without saying that the present invention is not limited to these examples. It is apparent that those skilled in the art may perceive various modification examples or correction examples within the scope disclosed in the claims, and those examples are also understood as falling within the technical scope of the present invention. In addition, each constituent in the embodiment may be used in any combination without departing from the gist of the invention.

The present application is based on Japanese Patent Application (JP2022-131119) filed on Aug. 19, 2022, the content of which is incorporated in the present application by reference.

EXPLANATION OF REFERENCES

1: projection portion
2: operation reception portion
2A, 3A: hollow portion
2*a*, 2*b*, 3*a*, 3*c*, 15*a*: opening
4: control device
4*a*, 62: memory
6: projection object
10: projection apparatus
11: projection surface
12: optical modulation unit
15: housing
21: light source
22: optical modulation portion
23: projection optical system
24: control circuit
31: second optical system
32, 122: reflective member
33: third optical system
34: lens
50: image processing apparatus
51: touch panel
61: processor
63: communication interface
64: user interface
65: sensor
69: bus
70: physical space
80: virtual projection surface
81: virtual projection surface installation position
91: virtual projection apparatus installation position
101: body part
102: first member
103: second member
104: projection direction changing mechanism
105: shift mechanism
106: optical unit
111: reference point
121: first optical system
151: projection center
191: perpendicular line
201: floor surface
211: camera position
d1: distance
G1: image
P1: position object
S1: first line segment
S2: second line segment

What is claimed is:

1. An image processing apparatus comprising a processor, wherein the processor is configured to:
acquire first image data obtained by imaging a space with an imaging apparatus;
determine a first position that is in the space and corresponds to a position of a virtual projection surface and a second position serving as a reference for an orientation of the virtual projection surface in the space;
determine the orientation of the virtual projection surface based on a positional relationship between the first position and the second position and generate virtual projection surface data representing the virtual projection surface;
generate second image data representing a second image in which the virtual projection surface is displayed on a first image represented by the first image data, based on the first image data and on the virtual projection surface data; and
output the second image data to an output destination.

2. The image processing apparatus according to claim 1, wherein the second position is a position that is not on a plane including the virtual projection surface.

3. The image processing apparatus according to claim 1, wherein the second position is at least one of an installation position of a virtual projection apparatus corresponding to the virtual projection surface, a position of the imaging apparatus, or a position of an observer who observes the virtual projection surface.

4. The image processing apparatus according to claim 1, wherein the processor is configured to:
calculate a first angle which is an angle formed by a first line segment connecting the second position and the first position and a plane including the second position and perpendicular or parallel to a direction of gravitational force; and
determine the orientation of the virtual projection surface based on a magnitude of the first angle.

5. The image processing apparatus according to claim 4, wherein the processor is configured to determine the orientation of the virtual projection surface as a surface parallel to the direction of gravitational force or a surface perpendicular to the direction of gravitational force according to a comparison result between the first angle and a threshold value.

6. The image processing apparatus according to claim 1, wherein the processor is configured to determine the first position and the second position based on an instruction received from a user.

7. The image processing apparatus according to claim 1, wherein the processor is configured to determine the orientation of the virtual projection surface based on the positional relationship and on an installation position of a virtual projection apparatus corresponding to the virtual projection surface.

8. The image processing apparatus according to claim 1, wherein the processor is configured to determine the orientation of the virtual projection surface based on the positional relationship and on a position of the imaging apparatus.

9. The image processing apparatus according to claim 1, wherein the processor is configured to determine a size of the virtual projection surface based on the orientation of the virtual projection surface and on an installation position of a virtual projection apparatus corresponding to the virtual projection surface to generate the virtual projection surface data.

10. The image processing apparatus according to claim 9, wherein the processor is configured to:

change the orientation of the virtual projection surface based on a change instruction of the orientation of the virtual projection surface received from a user;

change the size of the virtual projection surface based on the changed orientation of the virtual projection surface and on the installation position of the virtual projection apparatus; and update the virtual projection surface data and the second image data.

11. The image processing apparatus according to claim 1, wherein, in a case in which the processor detects a line or a surface in the space, which serves as a reference for the position of the virtual projection surface, the processor is configured to generate the virtual projection surface data by determining the position of the virtual projection surface on a plane including the virtual projection surface based on a position of the line or the surface.

12. The image processing apparatus according to claim 11, wherein the processor is configured to determine the position of the virtual projection surface such that a distance between the position of the line or the surface and an end part of the virtual projection surface is a predetermined offset value.

13. The image processing apparatus according to claim 1, wherein the processor is configured to:

change the position of the virtual projection surface based on a change instruction of the position of the virtual projection surface in a direction perpendicular to the virtual projection surface, the change instruction being received from a user;

change a size of the virtual projection surface based on the changed position of the virtual projection surface and on an installation position of a virtual projection apparatus corresponding to the virtual projection surface; and update the virtual projection surface data and the second image data.

14. The image processing apparatus according to claim 1, wherein the image processing apparatus is provided in an information processing terminal comprising the imaging apparatus and a display device, and the output destination is the display device.

15. An image processing method executed by a processor included in an image processing apparatus, the image processing method comprising:

acquiring first image data obtained by imaging a space with an imaging apparatus;

determining a first position that is in the space and corresponds to a position of a virtual projection surface and a second position serving as a reference for an orientation of the virtual projection surface in the space;

determining the orientation of the virtual projection surface based on a positional relationship between the first position and the second position and generating virtual projection surface data representing the virtual projection surface;

generating second image data representing a second image in which the virtual projection surface is displayed on a first image represented by the first image data, based on the first image data and on the virtual projection surface data; and outputting the second image data to an output destination.

16. A non-transitory computer-readable storage medium that stores an image processing program for causing a processor included in an image processing apparatus to execute a process comprising:

acquiring first image data obtained by imaging a space with an imaging apparatus;

determining a first position that is in the space and corresponds to a position of a virtual projection surface and a second position serving as a reference for an orientation of the virtual projection surface in the space;

determining the orientation of the virtual projection surface based on a positional relationship between the first position and the second position and generating virtual projection surface data representing the virtual projection surface;

generating second image data representing a second image in which the virtual projection surface is displayed on a first image represented by the first image data, based on the first image data and on the virtual projection surface data; and outputting the second image data to an output destination.

* * * * *